(12) United States Patent
Elliott et al.

(10) Patent No.: US 11,713,846 B2
(45) Date of Patent: Aug. 1, 2023

(54) OIL DRAIN PAN AND CONTAINER WITH VERTICALLY ADJUSTABLE FUNNEL

(71) Applicant: Hopkins Manufacturing Corporation, Emporia, KS (US)

(72) Inventors: William Elliott, Emporia, KS (US); Vicki Sickler, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 111 days.

(21) Appl. No.: 17/330,920

(22) Filed: May 26, 2021

(65) Prior Publication Data

US 2022/0381399 A1 Dec. 1, 2022

(51) Int. Cl.
*F16N 31/00* (2006.01)
*F16N 31/02* (2006.01)
*B65D 21/02* (2006.01)
*B67C 11/02* (2006.01)
*B65D 25/28* (2006.01)

(52) U.S. Cl.
CPC ......... *F16N 31/004* (2013.01); *B65D 21/023* (2013.01); *B65D 25/282* (2013.01); *B67C 11/02* (2013.01); *F16N 31/02* (2013.01); *B65D 2525/281* (2013.01); *B67C 2011/022* (2013.01)

(58) Field of Classification Search
CPC . F16N 31/004; F16N 31/02; B67C 2011/022; B65D 21/023
See application file for complete search history.

(56) References Cited

U.S. PATENT DOCUMENTS

| | | | |
|---|---|---|---|
| 4,513,865 A | 4/1985 | Melzi et al. | |
| 4,632,268 A | 12/1986 | Melzi et al. | |
| RE32,458 E | 7/1987 | Delay, Jr. | |
| 5,503,246 A | 4/1996 | Raboin et al. | |
| 6,367,586 B1 * | 4/2002 | Tally | F16N 31/004 141/231 |
| 2004/0256023 A1 | 12/2004 | Camoli | |
| 2019/0041000 A1 | 2/2019 | Kelly | |

* cited by examiner

*Primary Examiner* — Stephen J Castellano
(74) *Attorney, Agent, or Firm* — Hovey Williams LLP

(57) ABSTRACT

A container assembly for receiving and storing a fluid includes a hollow container body and a hollow support trunk. The container body has an internal chamber for receiving and storing a fluid. The container body includes a front wall and an opposing back wall at least partially defining the internal chamber. The front wall includes an opening therethrough to allow the fluid to be received in the internal chamber. The support trunk is coupled to the opening in the front wall. The support trunk extends through the internal chamber and includes a distal end engaging the back wall. The support trunk provides support to the front wall and channels the fluid from the opening to the internal chamber.

20 Claims, 18 Drawing Sheets

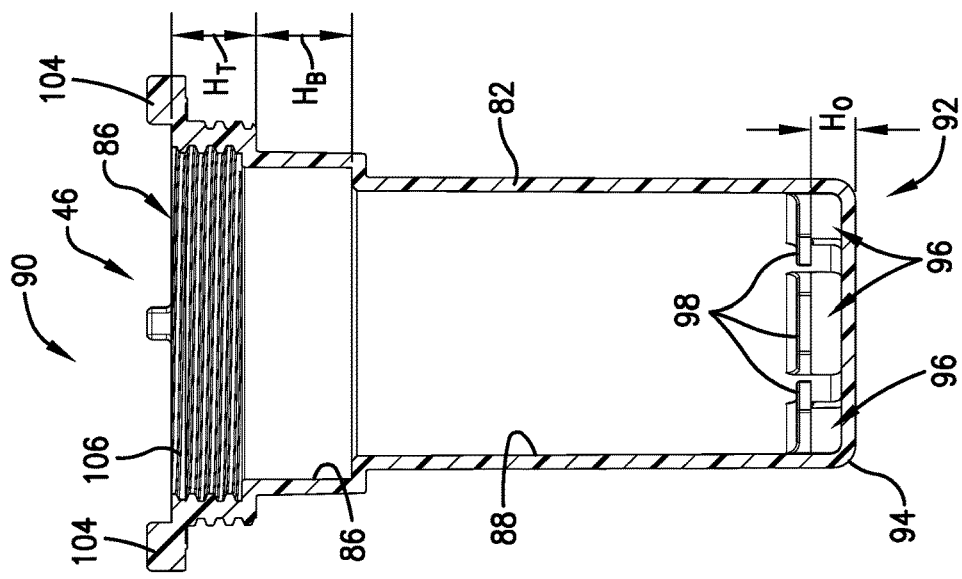
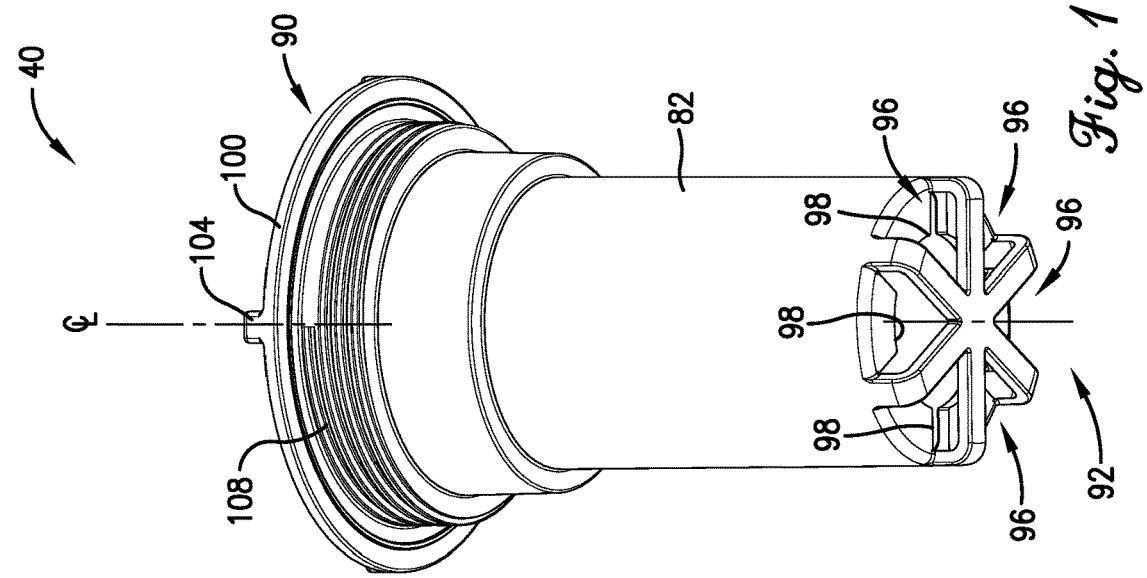
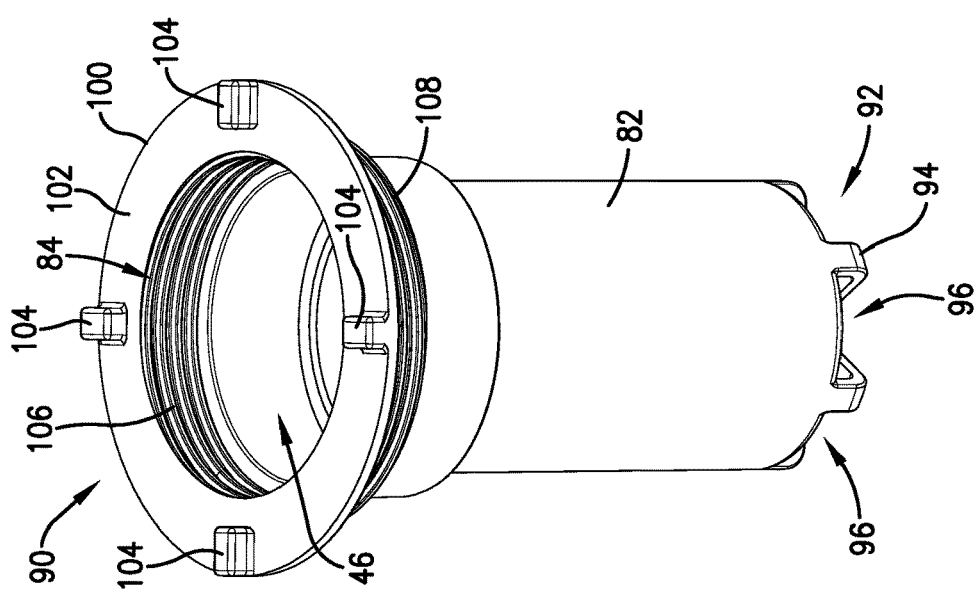

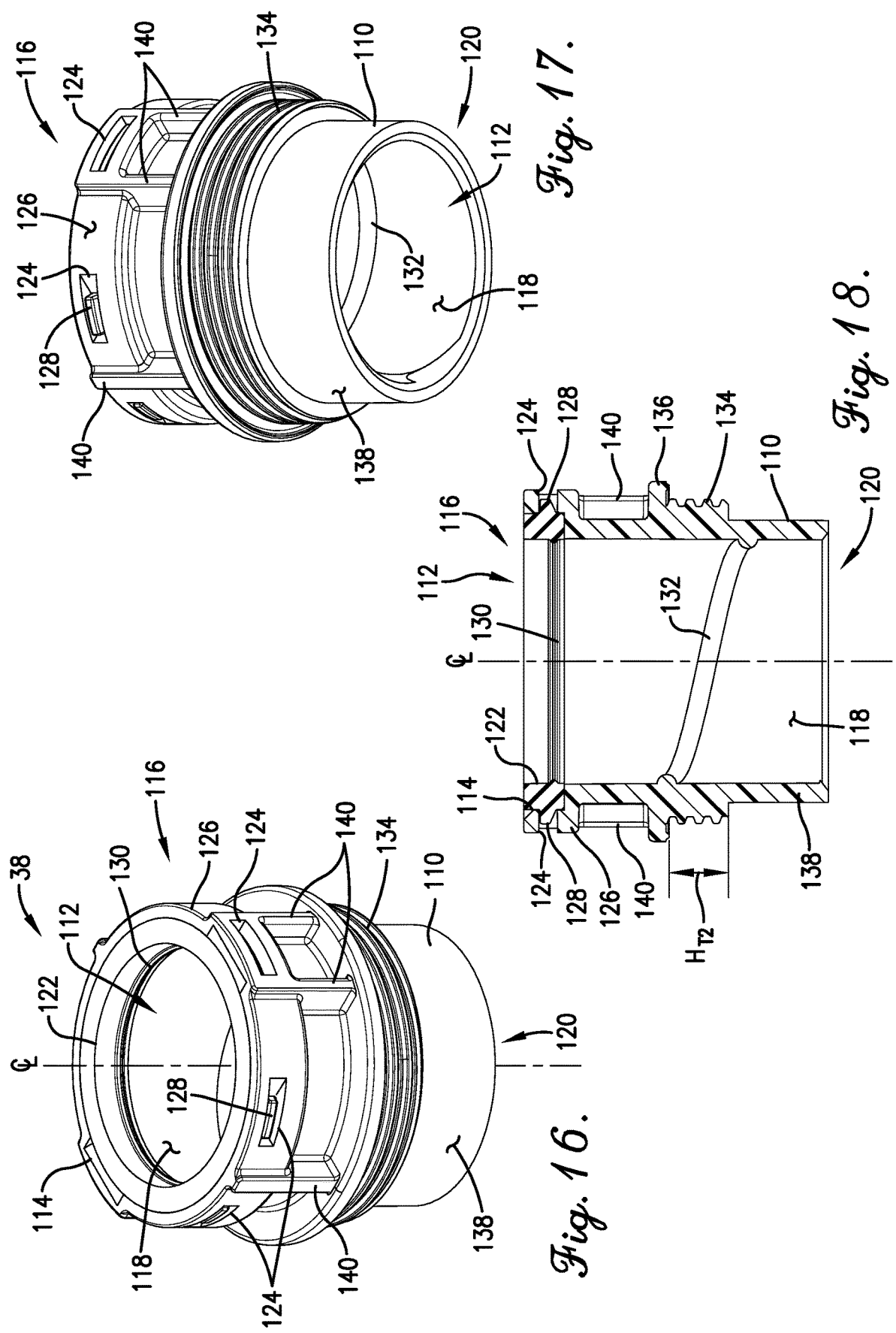

OIL DRAIN PAN AND CONTAINER WITH VERTICALLY ADJUSTABLE FUNNEL

BACKGROUND

The embodiments described herein relate generally to containers, and more particularly, to a fluid containers having a fluid collection system that can be stored on the container, for rapid deployment and ease of collecting a fluid.

Many containers have been devised for collecting waste oil as the oil is drained from the crankcase of an internal combustion engine of a motor vehicle. Crankcase oil is routinely and periodically drained by removing a drain plug from an opening in the crankcase, at the bottom of the engine. A container is placed beneath the crankcase to catch the oil as it drains. After the oil is drained, the drain plug is replaced. Typically, the container is repositioned to collect oil beneath an oil filter location of the engine to catch additional oil that drains when the oil filter is removed. After this additional oil is drained, the oil filter is replaced with a new filter. Repositioning the container, however, may cause the waste oil to splash and or spill.

Further, with the increased prevalence of trucks, an engine crankcase is often positioned higher from the ground surface. When the oil is drained from a crankcase positioned at an increased height, there is an increased risk of splashing and/or spilling of the oil as it drains. At least some known containers include a funnel to facilitate collecting oil in such situations. However, such known systems lack the stability of the funnel to adequately prevent spillage. The funnels may be directly coupled to the container, which is fabricated from a flexible material. As the oil drains into the funnel, the weight of the oil can cause the container to deform where the funnel connects. This causes the funnel to tilt, which can cause spillage. Further, such containers typically include fixed length extension tubes, preventing optimal placement of the funnel relative to the engine crankcase.

SUMMARY

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, a container assembly for receiving and storing a fluid is provided. The container assembly includes a hollow container body having an internal chamber for receiving and storing a fluid. The container body includes a front wall and an opposing back wall at least partially defining the internal chamber. The front wall includes an opening therethrough to allow the fluid to be received in the internal chamber. The container assembly also includes a hollow support trunk coupled to the opening in the front wall. The support trunk extends through the internal chamber and includes a distal end engaging the back wall. The trunk support provides support to the front wall and channeling the fluid from the opening to the internal chamber.

In another aspect, a container assembly for receiving and storing a fluid is provided. The container assembly includes a hollow container body having an internal chamber for receiving and storing a fluid. The container assembly also includes a hollow support trunk coupled to the hollow container body. The support trunk defines an opening to allow the fluid to be received in the internal chamber. In addition, the container assembly includes a fluid collection system configured for multi-axis adjustment. The fluid collection system includes a hollow funnel support/wiper component releasably coupled to the support trunk. The funnel support/wiper component includes an internal thread. The fluid collection system also includes a hollow extension tube threadably coupled to the funnel support/wiper component via the internal thread. Rotation of the extension tube adjusts the extension tube in an axial direction relative to the funnel support/wiper component. Moreover, the fluid collection system includes a funnel coupled to the extension tube. The funnel is rotationally adjustable relative to the extension tube at least 360°.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 13 is a top perspective view of the support trunk of the container assembly in accordance with one aspect of the present invention;

FIG. 14 is a bottom perspective view of the support trunk;

FIG. 15 is a side section view of the support trunk;

FIG. 16 is a top perspective view of the funnel support/wiper component of the container assembly, in accordance with one aspect of the present invention;

FIG. 17 is a bottom perspective view of the funnel support/wiper component;

FIG. 18 is a side section view of the funnel support/wiper component;

Figure 1:
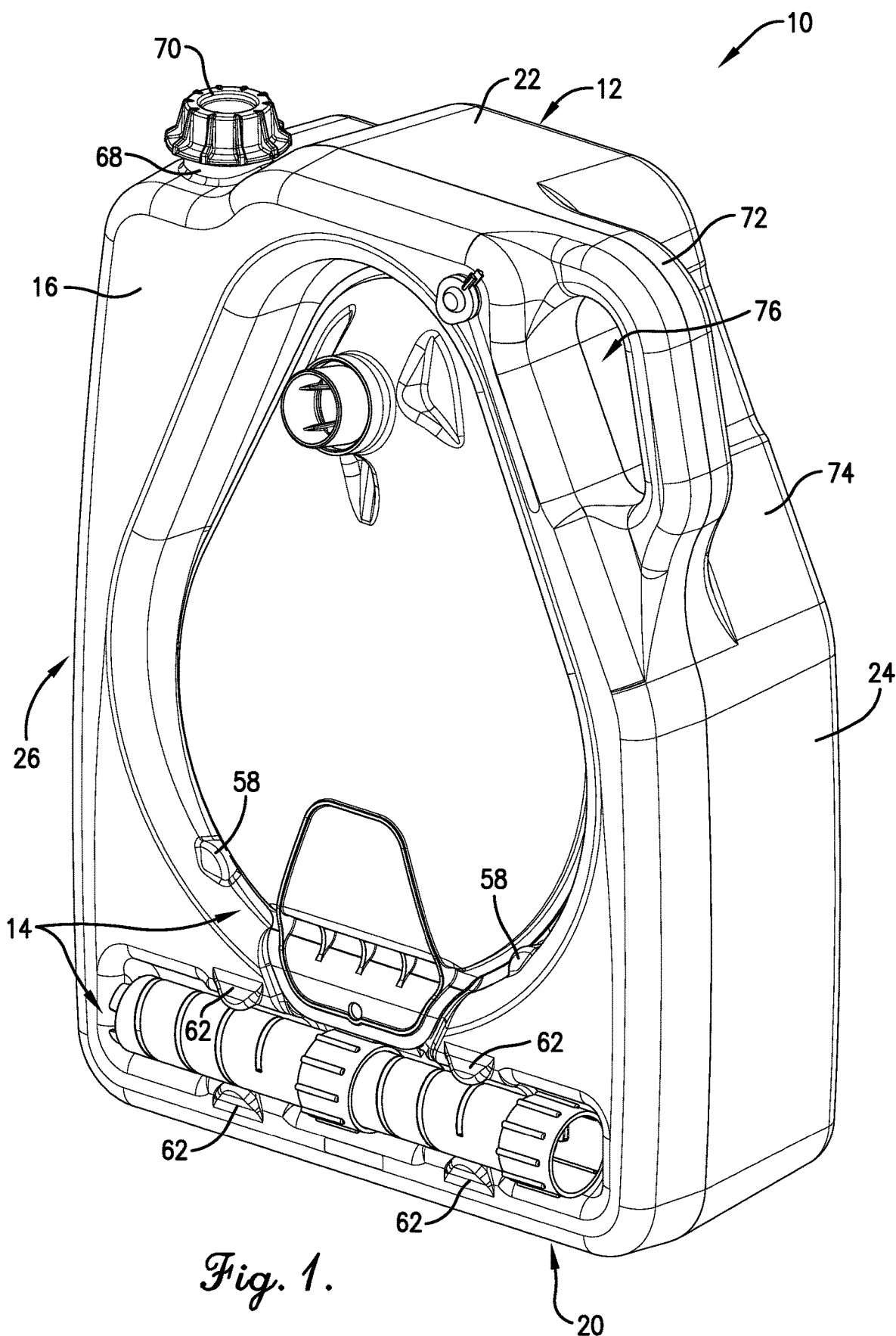
FIG. 1 is a front perspective view of a container assembly in a before use packaged configuration, according to one aspect of the present invention.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, etc. described in one embodiment may also be included in other embodiments but is not necessarily included. Thus, the present technology can include a variety of combinations and/or integrations of the embodiments described herein.

In the following specification and claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, directional references, such as, "top," "bottom," "front," "back," "side," "upward," "downward," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

Figure 2:
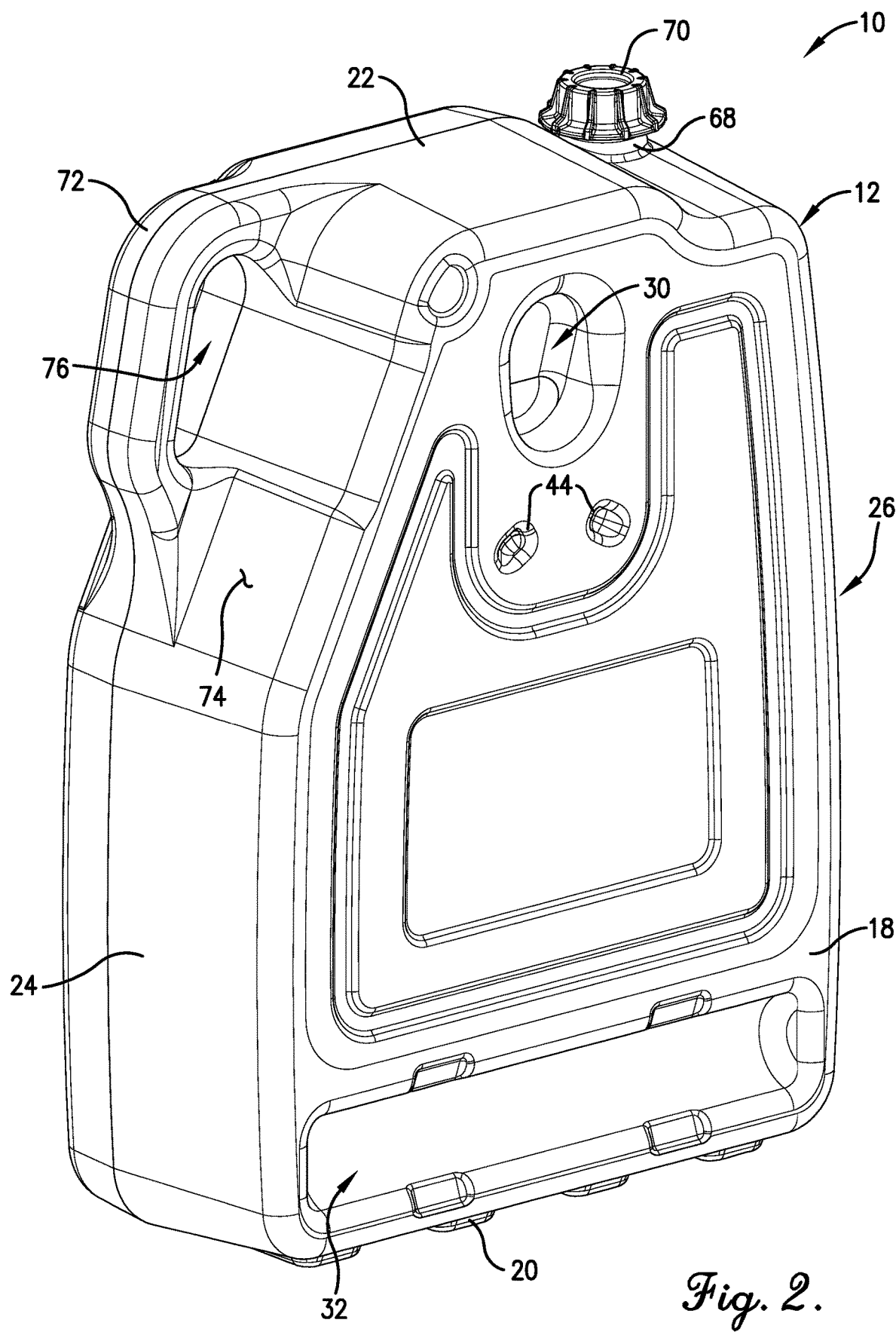
FIG. 2 is a rear perspective view of the container assembly.

FIG. 1 is a front perspective view of a container assembly 10 in a before use packaged configuration, according to one aspect of the present invention. FIG. 2 is a rear perspective view of the container assembly 10. In the exemplary embodiment, the container assembly 10 is selectively configurable between the before use packaged configuration, a use configuration, and a storage configuration, as described further herein. The container assembly 10 includes a container body 12 and a fluid collection system 14 removably attached thereto. The container body 12 includes a front wall 16 and a generally opposing back wall 18. The container body 12 includes also includes a bottom wall 20, a top wall 22, a first side wall 24, and a second side wall 26 extending between and joining the front wall 16 to the back wall 18. The container body 12 is substantially hollow, having an internal chamber 28 (See FIG. 8). The internal chamber 28 is configured to hold or store a fluid therein. In one embodiment, the container body 12 is configured to receive and store engine oil within the internal chamber 28. It is noted, however, that the container body 12 may receive and store any type of fluid desired by a user of the container assembly 10.

The back wall 18 includes a plurality of a recesses defined therein. A first recess 30 (or inwardly projecting boss) projects inwardly from the back wall 18 and is positioned proximate the top wall 22, being generally centered between the first and second side walls 24 and 26. Similarly, a second recess 32 or pocket projects inwardly from the back wall 18 and is positioned proximate the bottom wall 20, being generally centered between the first and second side walls 24 and 26. The first and second recesses 30 and 32 are configured to receive a portion of the fluid collection system 14 therein when two or more container assemblies 10 are stacked (See FIGS. 3 and 4).

Figure 3:
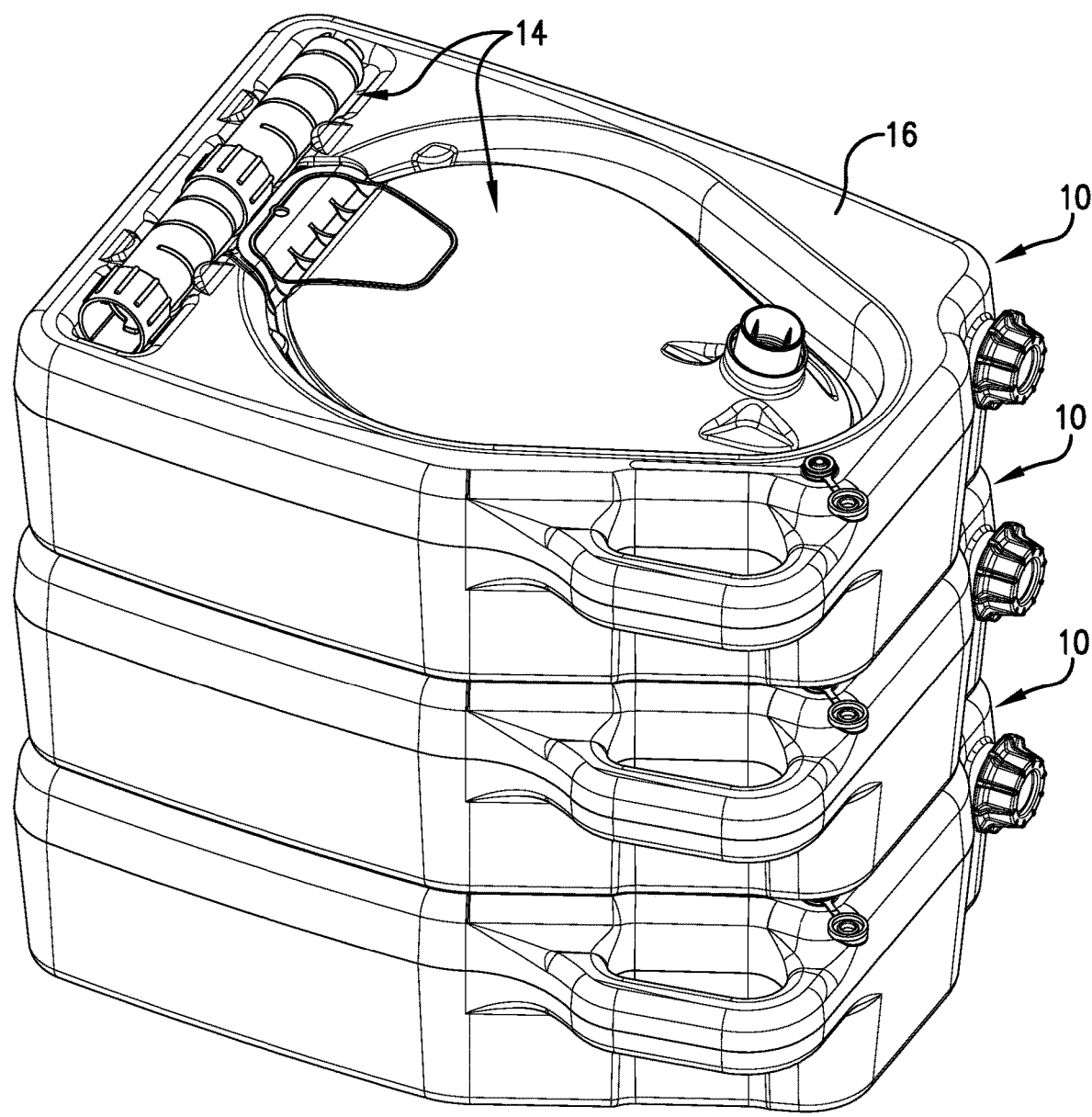
FIG. 3 is a perspective view depicting a plurality of stacked container assemblies.
Figure 4:
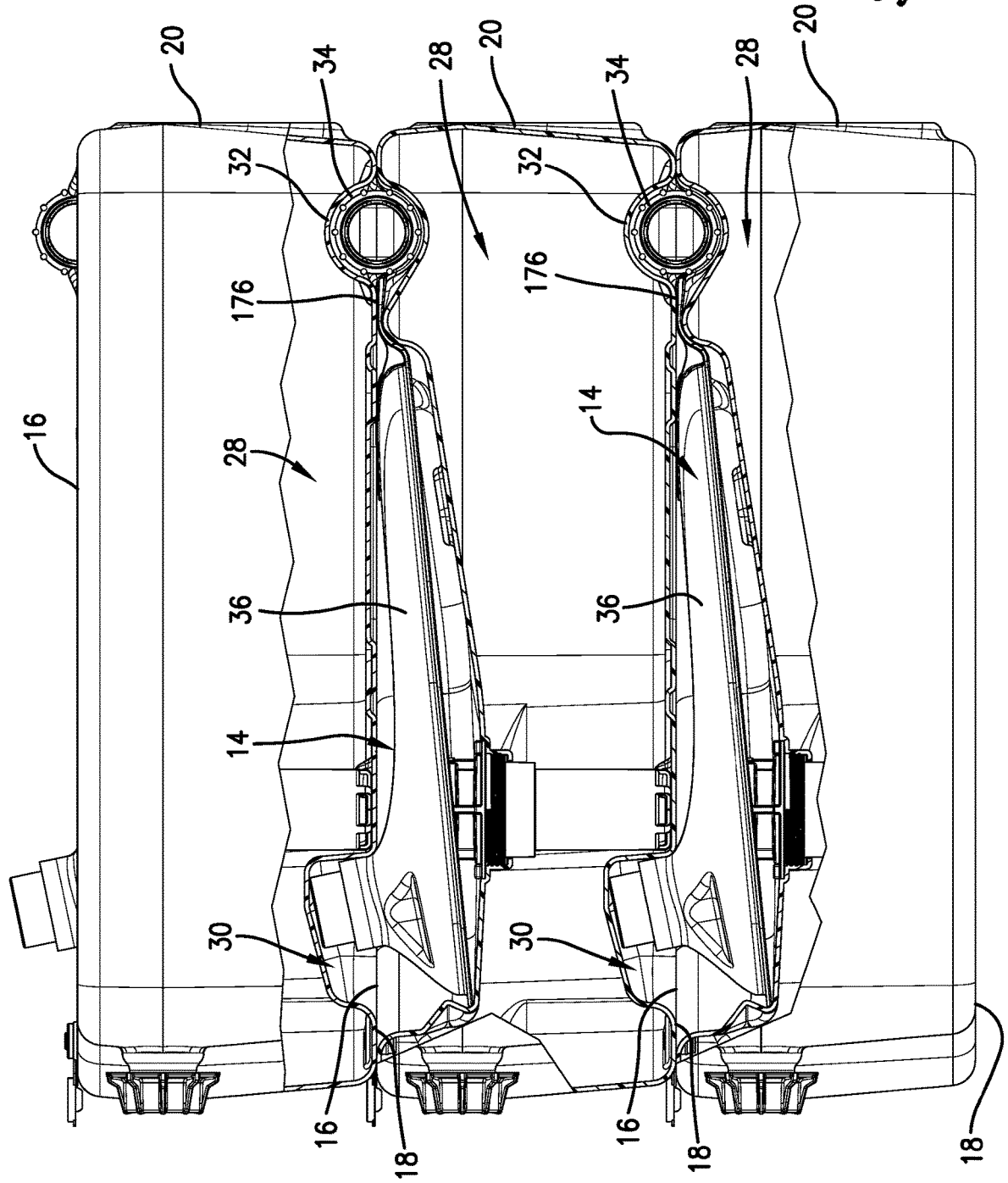
FIG. 4 is a partial section view of FIG. 3.

FIG. 3 is a perspective view depicting a plurality of container assemblies 10 stacked in a horizontal orientation. FIG. 4 is a section view of FIG. 3 taken about line 4-4, shown in FIG. 3. As described above, the container body 12 includes recesses 30 and 32 that enable two or more container assemblies 10 to be stacked. In a retail setting, shelf space is limited. Thus, it is desirable to stack as many container assemblies 10 together as possible for a given amount of shelf space. In the exemplary embodiment, the recesses 30 and 32 enable the back wall 18 of one container assembly 10 to be placed directly against the front wall 16 of an adjacent container assembly 10. This enables a plurality of a container assemblies 10 to be stacked in a stable configuration with the extending portions of the fluid collection system 14 of one container assembly 10 being nested in the recesses 30 and 32 of an adjacent container assembly 10.

Figure 5:
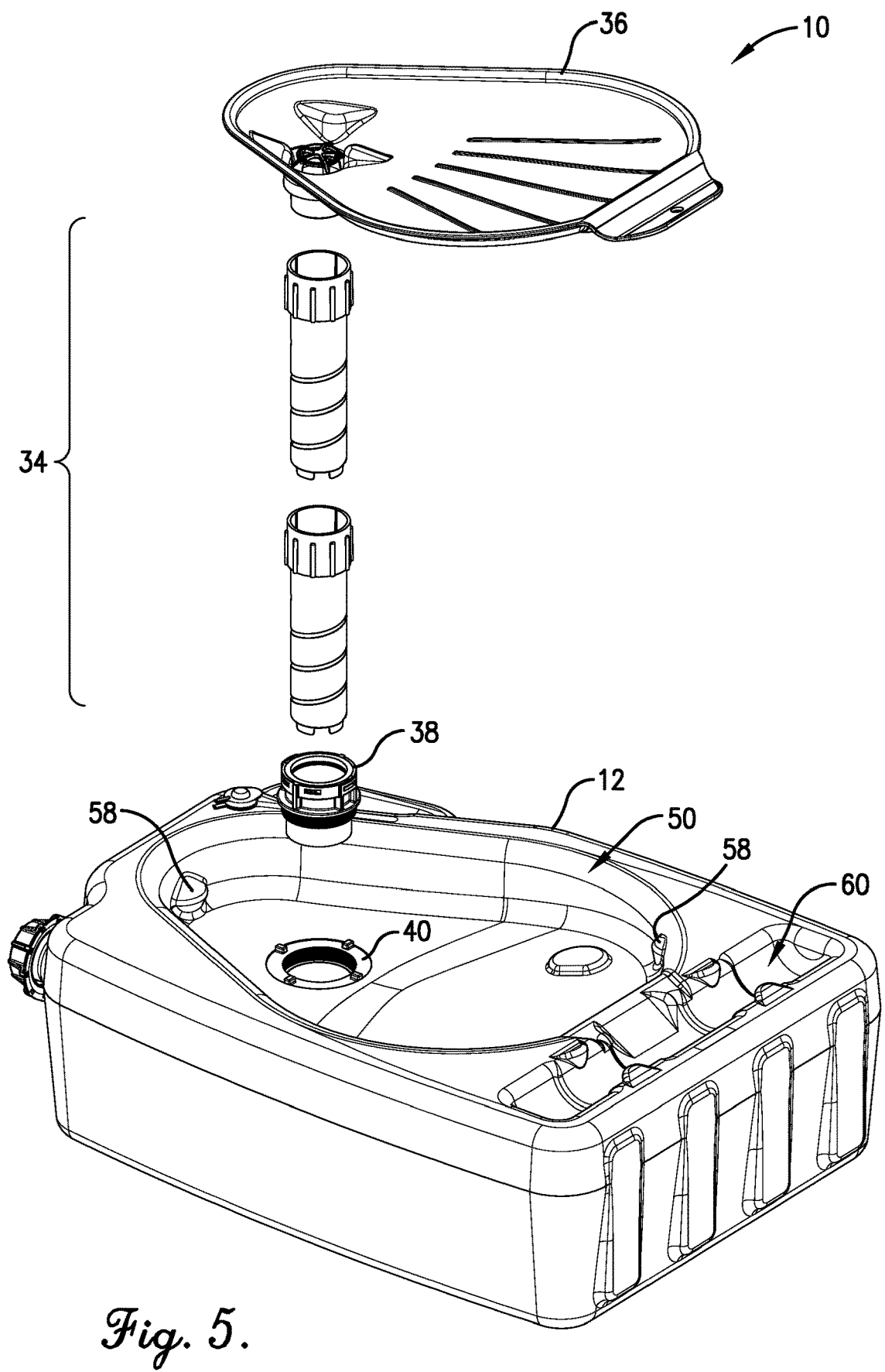
FIG. 5 is an exploded perspective view of the container assembly in a use configuration, according to one aspect of the present invention.
Figure 6:
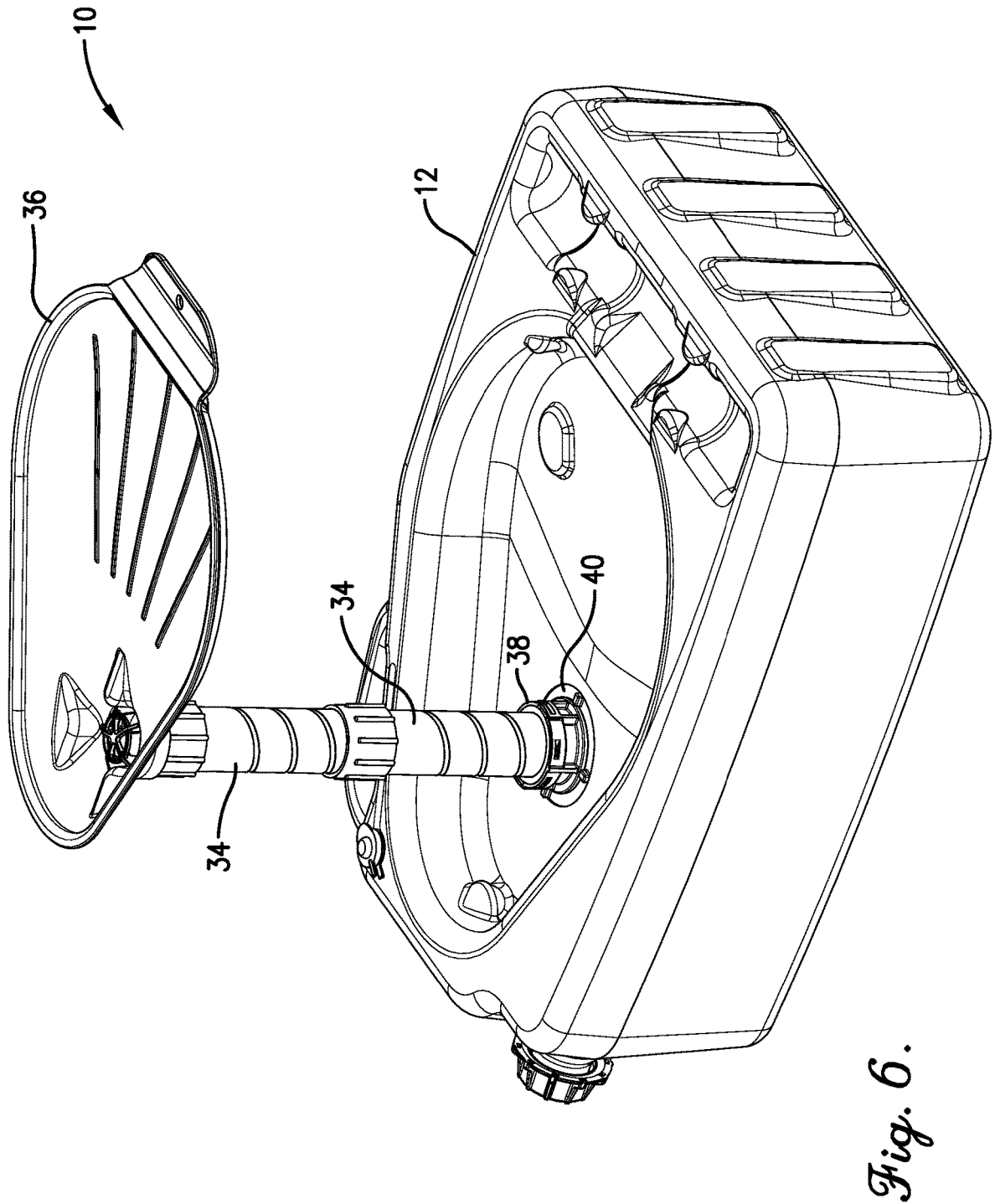
FIG. 6 is a perspective view of the container assembly in the use configuration.
Figure 7:
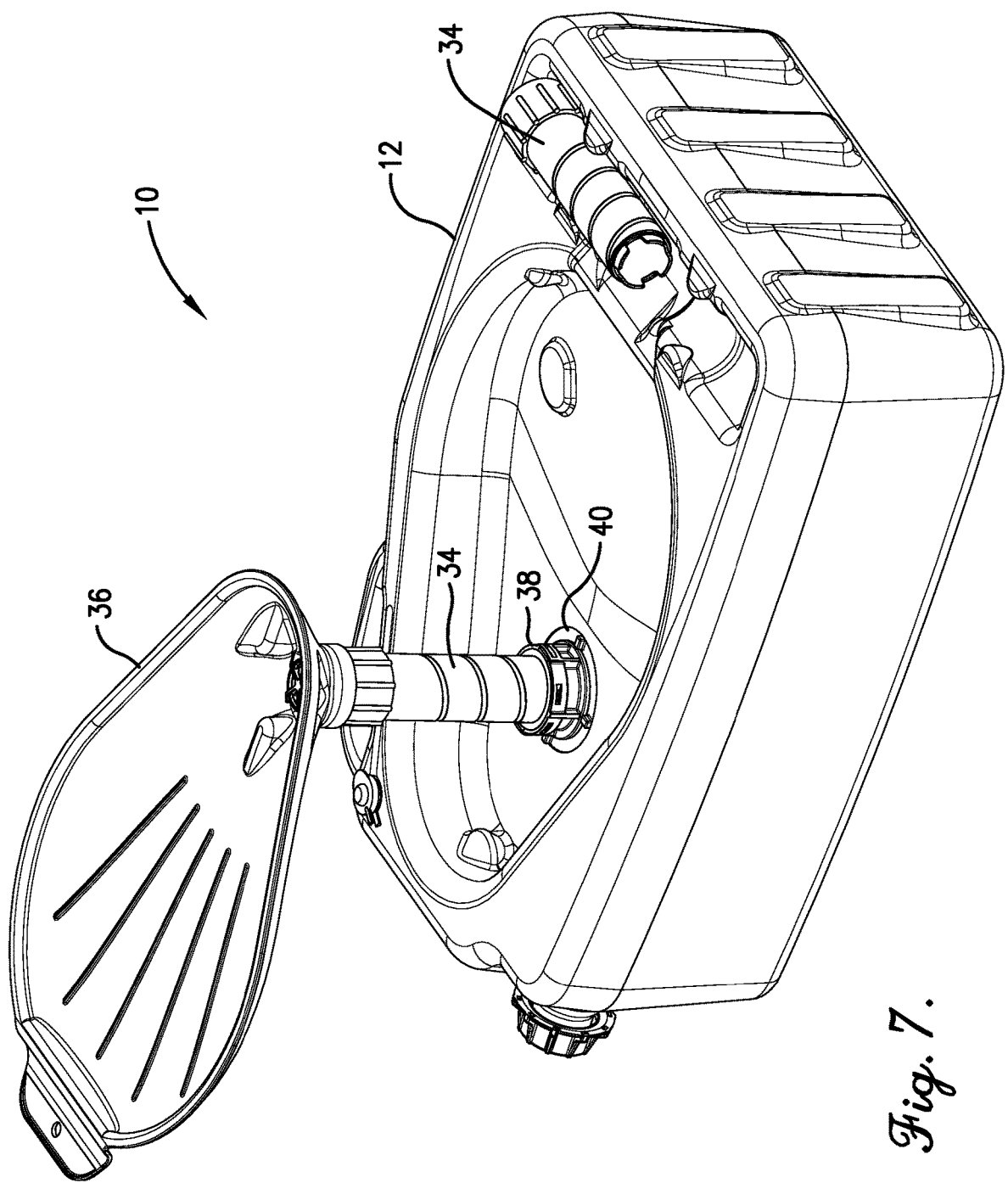
FIG. 7 is a perspective view of the container assembly in a use configuration, according to another aspect of the present invention.

FIG. 5 is an exploded perspective view of the container assembly 10 in a use configuration, according to one aspect of the present invention. FIG. 6 is a perspective view of the container assembly 10 in the use configuration. FIG. 7 is a perspective view of the container assembly 10 in a use configuration, according to another aspect of the present invention. As described above with reference to FIG. 1, the container assembly 10 includes the removably attached fluid collection system 14. In the exemplary embodiment, the fluid collection system 14 includes two (2) extension tubes 34, a funnel 36, and a funnel support/wiper component 38. The fluid collection system 14, and more particularly, the funnel support/wiper component 38, is attached to the container body 12 via a support trunk 40. The support trunk 40 is removably attached to the container body 12, as described further herein.

When configured in the before use packaged configuration, the funnel support/wiper component 38 is coupled to the support trunk 40 and the funnel 36 and extension tubes 34 are coupled to the front wall 16 of the container body 12. In the use configuration, the fluid collection system 14 are coupled together for use in draining a fluid, as depicted in FIGS. 6 and 7. In the storage configuration, depicted in FIG. 11, a detachable drain cap is coupled to the support trunk 40 and the funnel and extension tubes 34 are coupled to the front wall 16. The funnel support/wiper component 38 is coupled to the spout of the funnel 36.

When configured in the use configuration, the funnel support/wiper component 38 is releasably coupled to the container body 12, as described in more detail below. One of the extension tubes 34 is connected to the funnel support/wiper component 38. (See FIGS. 5 and 7) As will be described in more detail below, the extension tube 34 is adjustable in height relative to the funnel support/wiper component 38. This enables a height of the funnel 36 to be adjusted relative to the container body 12. As depicted in FIG. 6, in one embodiment, a second extension tube 34 may be connected to the top of the extension tube 34 connected to the funnel support/wiper component 38. It is noted, however, that the second extension tube 34 is optional. As depicted in FIG. 7, only one extension tube 34 is in use. In either embodiment, the funnel 36 is connected to the top of the extension tube 34 and is configured to be swiveled or rotated there about any amount desired by a user of the container assembly 10.

Figure 8:
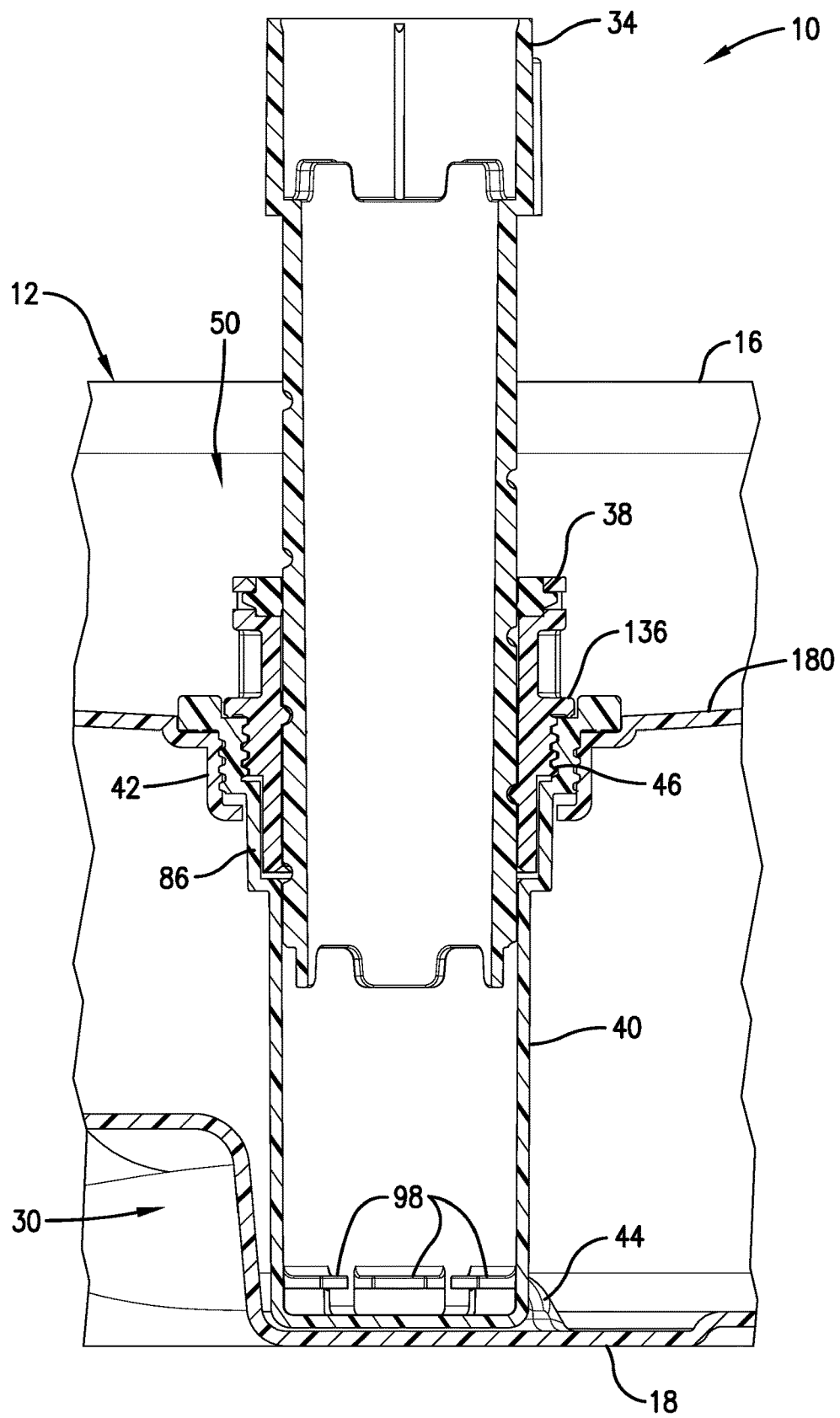
FIG. 8 is a section view of the container assembly depicted in FIG. 7.

FIG. 8 is a section view of the container assembly 10 depicted in FIG. 7, taken about line 8-8 shown in FIG. 7. In FIG. 8, the funnel 36 is not shown for clarity. In the example embodiment, the support trunk 40 is attached to the container body 12, for example, via threaded engagement. In particular, the support trunk 40 is threadably attached to a threaded bore 42 defined in the container body 12. The threaded bore 42 defines an opening in a sloping surface 180 the front wall 16 allowing a fluid to collect in the internal chamber 28 of the container body 12. The support trunk 40 extends through the internal chamber 28 and directly engages the back wall 18 in face-to-face contact. Referring back to FIG. 2, the back wall 18 includes two (2) trunk support bosses 44 positioned proximate the first recess 30. In certain other embodiments, the back wall 18 may contain any number of trunk support structures that enables the container assembly 10 to function as described herein. In the exemplary embodiment, the two (2) trunk support bosses 44 are positioned such that three tangent points of an inscribed circle contacting the walls defining each of the two (2) trunk support bosses 44 and the recess 30 define an equilateral triangle. It is noted, however, that the trunk support bosses 44 may be located in any positioned relative to the first recess 30 that enables the container assembly 10 to function as described herein.

The support trunk 40 is sized such that the end in contact with the back wall 18 seats between the structures defining two (2) trunk support bosses 44 and the first recess 30. A height of the support trunk 40 is sized to provide vertical support to the front wall 16 of the container body 12. The structures in the back wall 18 defining the trunk support bosses 44 and the first recess 30 function to provide lateral support to the end of the support trunk 40. Accordingly, the support trunk 40 is held substantially in place by the treaded connection and the recess structures. This enables to support trunk 40 to provide support to the fluid collection system 14 during use. That is, the fluid collection system 14 may be held substantially in place while a fluid, such as waste oil, is drained therethrough.

With continued reference to FIG. 8, the funnel support/wiper component 38 is attached to the support trunk 40, for example, via threaded engagement. In particular, the funnel support/wiper component 38 is threadably attached to threads of a stepped bore 46 defined in the support trunk 40. Likewise, the extension tube 34 is attached to the funnel support/wiper component 38, for example, via threaded engagement to facilitate vertical positioning of the extension tube 34 relative to the container body 12.

Figure 9:
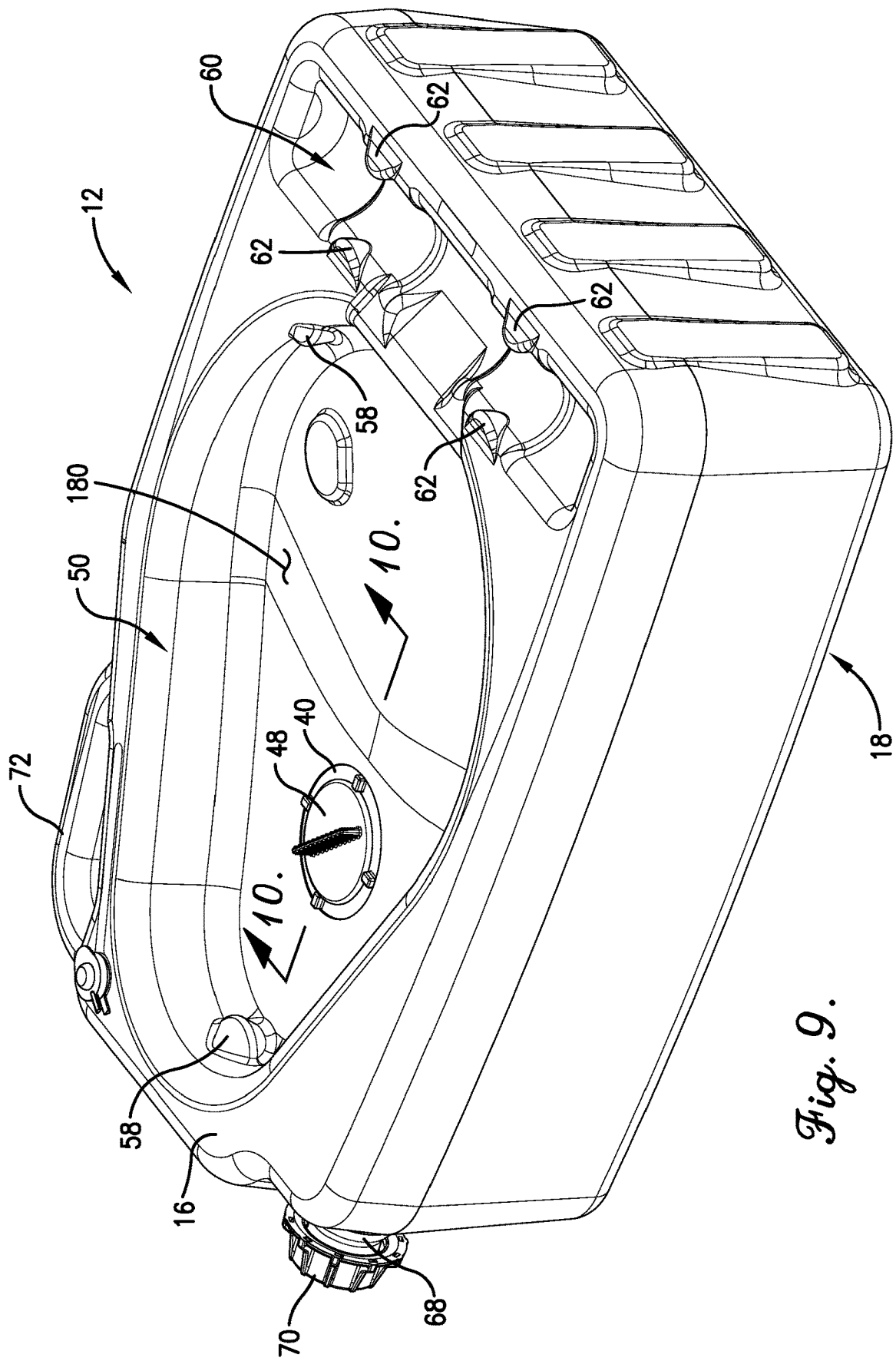
FIG. 9 is a perspective view of the container assembly with a drain cap attached to seal a fluid therein.
Figure 10:
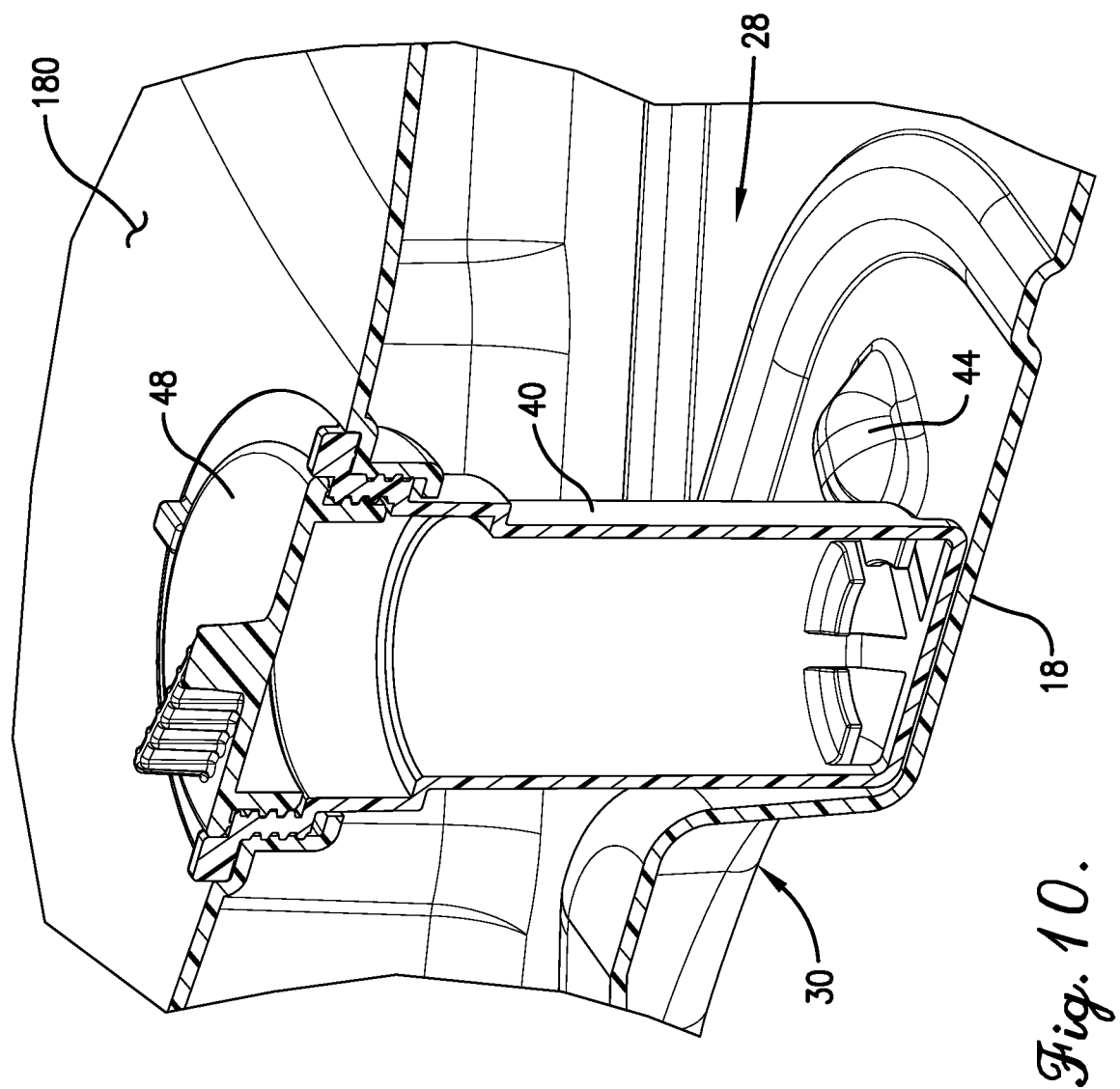
FIG. 10 is an enlarge sectional view of the drain cap portion of FIG. 9.
Figure 11:
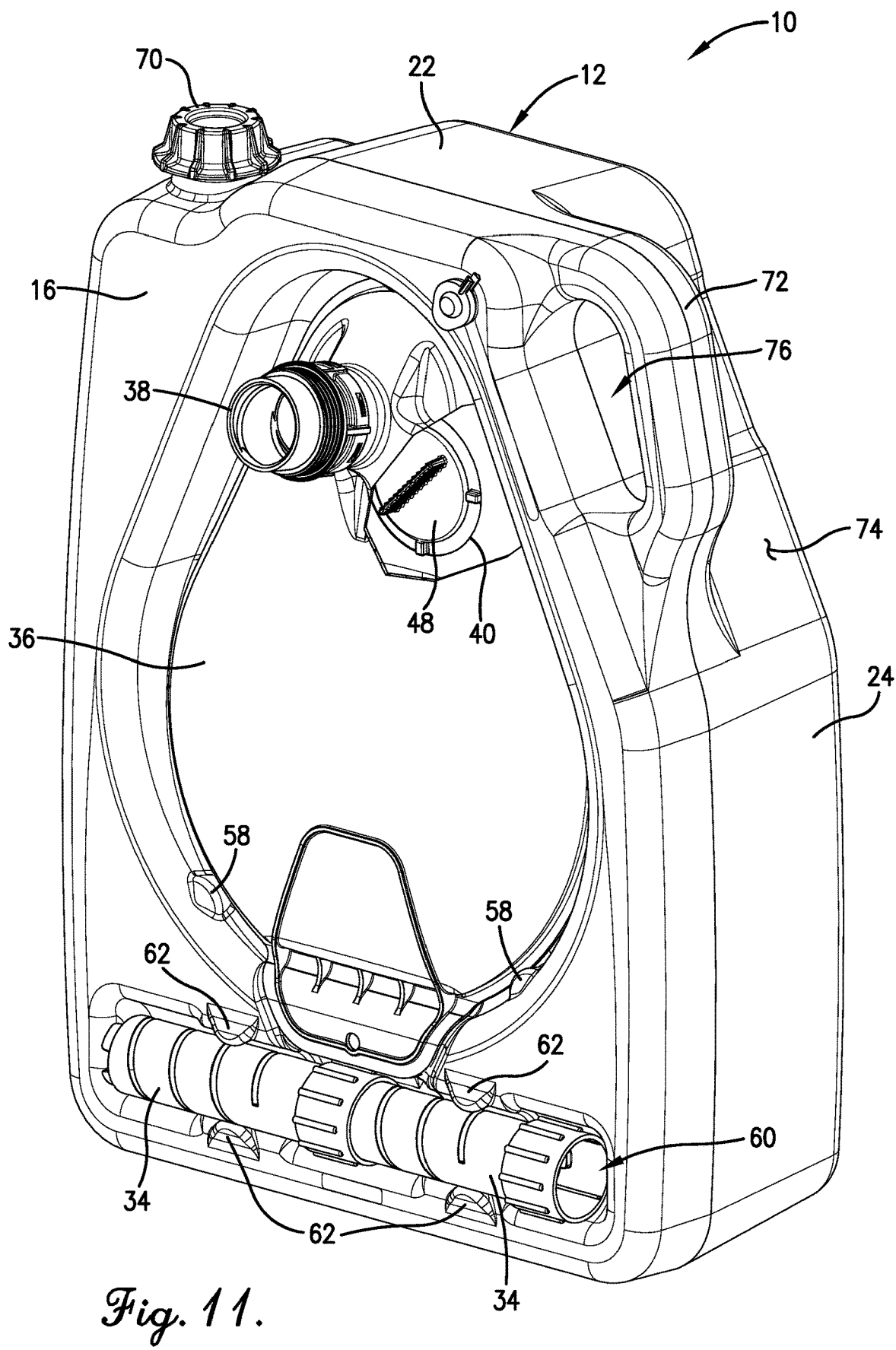
FIG. 11 is a perspective view of the container assembly in a storage configuration, according to another aspect of the present invention.

After use, the fluid drained into the internal chamber 28 may be secured therein via a drain cap 48, as depicted in FIGS. 9 and 10. For example, the container assembly 10 may be provided with a detachable drain cap 48 sized for plugging the opening of the support trunk 40. The drain cap 48 seals the support trunk opening to prevent leakage of fluid therefrom when the container assembly 10 is lifted. More particularly, after a user completes the process of draining a fluid into the container body 12, the funnel support/wiper component 38 and any extension tubes 34 are removed or detached from the container body 12. The drain cap 48 is coupled to the support trunk 40, for example, via threaded engagement. As depicted in FIG. 11, the fluid collection system 14 may be cleaned and attached to the container body 12, for example, for storage in a storage configuration, as depicted. In particular, the funnel 36 may be pressed into place on the front wall 16 of the container body 12 and held there by a plurality of flexible fingers 58. In addition, each of the extension tubes 34 may be pressed into place on the front wall 16 of the container body 12 and held there by a plurality of flexible fingers 62. The funnel support/wiper component 38 may be coupled to the funnel 36.

Figure 12:
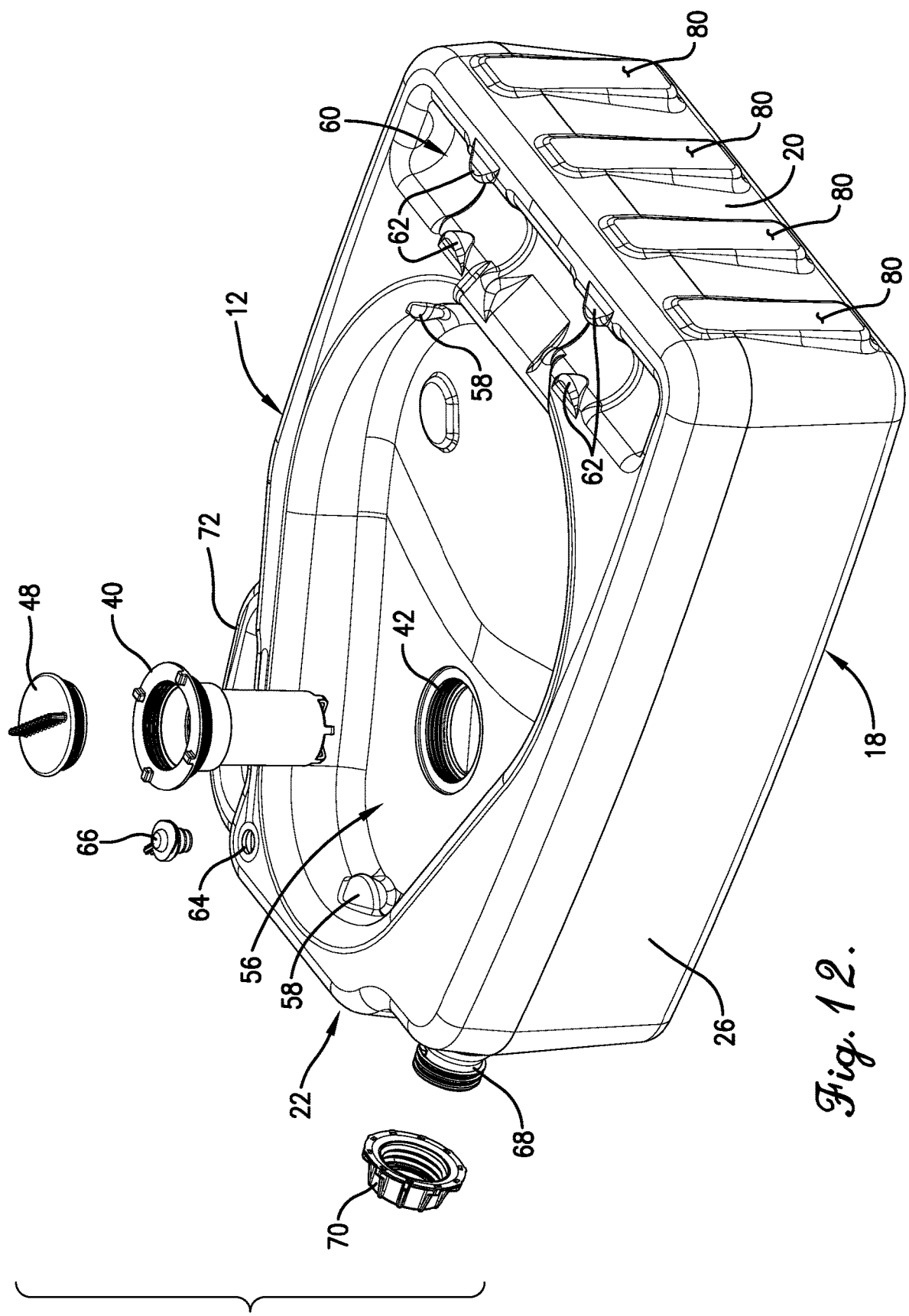
FIG. 12 is an exploded perspective view of the container body of the container assembly shown in FIG. 1.

FIG. 12 is an exploded perspective view of the container body 12. With reference to FIGS. 1,2, and 8-12, in the exemplary embodiment, as described above, the container body 12 includes the front wall 16, the back wall 18, the bottom wall 20, the top wall 22, the first side wall 24, and the second side wall 26.

The front wall 16 includes a large inwardly extending fluid channeling portion 50 configured to channel a fluid, such as waste oil, to the threaded bore 42. The threaded bore 42 defines an opening into the internal chamber 28 and is configured to receive the support trunk 40. The fluid channeling portion 50 is defined by an inwardly sloping surface 180 and a surrounding side wall 54. It is noted that the threaded bore 42 is generally located at the lowermost portion 56 of the sloping surface 180. In the exemplary embodiment, the side wall 54 includes a plurality of inwardly projecting flexible fingers 58 configured to engage an outer flange portion 190 (shown in FIGS. 22-23) of the funnel 36 to secure it in place. The flexible fingers 58 are sized and shaped to facilitate securement of the funnel 36 while providing easy attachment/detachment of the funnel 36 to/from the body 12.

In addition to the fluid channeling portion 50, the front wall 16 includes an inwardly extending extension tube pocket 60 configured to secure the extension tubes 34 to the front wall 16. In the exemplary embodiment, the extension tube pocket 60 is generally semi-circular in shape, extending in an arc of substantially one hundred and eighty degrees (180°). It is noted however, that the extension tube pocket 60 may extend at other arc angles or may be formed in shapes other than semi-circular. In the exemplary embodiment, the extension tube pocket 60 includes a plurality of inwardly projecting flexible fingers 62 configured to engage an outer edge portion of one of the extension tubes 34 to secure it in place. The flexible fingers 62 are sized and shaped to facilitate securement of the extension tubes 34 while providing easy attachment/detachment of the extension tubes 34 to/from the body 12.

With reference to FIG. 12, in the exemplary embodiment, the front wall 16 includes a vent opening 64 in fluid communication with the internal chamber 28. The vent opening is sized and shaped to receive a vent cap assembly 66, which may be fabricated from a resilient flexible material to facilitate pressing the assembly into the vent opening 64. The vent cap assembly 66 may include a removable cap portion that can be opened/closed to vent/seal the internal chamber 28. It is contemplated that the vent cap assembly may be attached to the front wall 16 other than via a press fit configuration. For example, in certain embodiments, the vent opening 64 and vent cap assembly 66 may threadably engage each other. In other embodiments, the vent opening 64 and vent cap assembly 66 may be arranged to seal the vent opening in a snap fit fashion, or in any other manner that provides a seal between vent opening 64 and vent cap assembly 66.

The top wall 22 includes a hollow tubular spout 68 that is in fluid communication with the internal chamber 28 to facilitate emptying fluid from the internal chamber 28. The spout 68 has an external thread (not shown) that is configured to secure a detachable cap 70 for closing the spout 68.

In the exemplary embodiment, the container body 12 includes a handle 72. More particularly, the first side wall 24 includes the handle proximate the top wall 22. Thus, when the container body 12 is standing in a vertical position, with the bottom wall 20 positioned on a ground surface, the handle 72 is positioned near the top of the container body 12 for easy grasping by a user.

With reference to FIG. 11, the side wall 24 has an angled portion 74 that angles inwards towards the opposite side wall 26. The handle 72 extends outward from the angled portion 74 and is generally flush with the top wall 22. The handle 72 turns and extends generally downward from the top wall 22 and connects to the lower portion of the angled portion 74 of the side wall 24. The handle 72 provides a location where the container assembly 10 may be readily grasped for transporting the container assembly 10. The handle 72 is preferably sized to accommodate a user's hand to provide a lifting point for the container assembly 10. In the exemplary embodiment, the handle 72 is preferably integrally fabricated with the container body 12 to facilitate increasing the strength of the handle. Alternatively, the handle 72 may be coupled to the container body using any suitable means known in the art, including, for example, mechanical fastening, bonding, welding, and the like. To facilitate grasping of the handle 72, a finger slot 76 is defined between the handle 72 and the angled portion 74 of the side wall 24.

With reference to FIG. 12, the bottom wall 20 includes a plurality of substantially planar supports 80. As described in more detail below, the example container body 12 is a molded component. Accordingly, many features of the container body 12 described herein may have a draft angle associated with each wall and/or cavity to promote removal of the container body 12 from a mold. The planar supports 80 provide a flat surface that facilitates standing the container assembly upright on the bottom wall 20. In the exemplary embodiment, the container body 12 includes four (4) planar supports 80, generally evenly spaced across the bottom wall 20. However, in other embodiments, the container body may include fewer or more planar supports, which may be spaced in any manner that enables the container assembly 10 to function as described herein. It is noted that each of the planar supports 80 lie in substantially the same plane, thereby providing a substantially singular flat surface.

In the exemplary embodiment, the container body 12 is preferably fabricated from a thermoplastic synthetic resin suitable for use as a container for a hazardous fluid, such as waste oil. In one embodiment, the container body 12 is fabricated from high density polyethylene (HDPE), although other suitable materials are contemplated. The material used to fabricate the container body 12 should be chemically impervious to liquids such as engine oil, even at elevated temperatures, such as one hundred and seventy degrees Fahrenheit (170° F.). The example container body 12 is preferably fabricated by blow molding, where a gas (e.g., air) is blown into a heated hollow tube of material positioned in a mold. The gas inflates the heated material into the shape of the mold. It is noted, however, that the container body 12 may be fabricated by methods other than molding, e.g., machining, and therefore, may not have a draft angle associated with the features as described herein.

FIG. 13 is a top perspective view of the support trunk 40, in accordance with one aspect of the present invention. FIG. 14 is a bottom perspective view of the support trunk 40. FIG. 15 is a side section view of the support trunk 40, taken about line 15-15 shown in FIG. 13. In the example embodiment, the support trunk 40 includes a body 82 having a stepped bore 46 extending axially therethrough. The stepped bore 46 includes a threaded portion 84 at a first end 90 of the body 82. The threaded portion 84 includes female threads 106 configured to threadably receive a portion of the funnel support/wiper component 38, as shown in FIG. 8. In addition, the threaded portion 84 includes male threads 108 configured to threadably engage the container body 12, and more particularly, the threaded bore 42 (see FIG. 8). In the exemplary embodiment, the threaded portion 84 extends axially along the stepped bore 46 a predetermined distance "$H_T$."

The stepped bore 46 also includes a first cylindrical bore 86 that extends from the threaded portion 84 a predetermined distance "$H_B$," which is sized to receive a portion of the funnel support/wiper component 38, as shown in FIG. 8. Further, the stepped bore 46 includes a second cylindrical bore 88 that extends from the first cylindrical bore 86 toward a second end 92 of the body 82. The second cylindrical bore 88 is configured to receive a portion of an extension tube 34 therein, as depicted in FIG. 8.

At the second end 92, the second cylindrical bore 88 is partially closed or blocked by a lattice structure 94 defining a plurality of openings 96. The lattice structure 94 is configured to engage the back wall 18 of the container body 12 when the support trunk 40 is coupled to the container body 12. The plurality of openings 96 allow fluid, such as waste oil, to flow into the internal chamber 28 of the container body 12 while the lattice structure 94 remains in contact with the back wall 18. In the exemplary embodiment, each of the openings 96 is substantially the same size and shape. With reference to FIG. 14, the openings 96 are pie-shaped, being circumferentially spaced about a centerline of the support trunk 40. As shown in FIGS. 13-15, the openings 96 extend upward from the second end 92 a predetermined distance "$H_O$" to allow fluid to flow through the openings 96 when the lattice structure is in contacted with the back wall 18. While the openings 96 are depicted as being pie-shaped, it is contemplated that the openings can have any size or shape that enables the container assembly 10 to function as described herein.

Further, at the second end 92, the support trunk 40 includes a plurality of inwardly projecting tabs 98. The tabs 98 project inward toward the trunk centerline and are configured to contact the bottom edge of an extension tube 34, thereby preventing the extension tube 34 from extending down further and potentially blocking one or more of the openings 96.

At the first end 90, the support trunk 40 has an annular flange portion 100 that extends radially outward from the female threaded portion 84 at the first end 90. The annular flange portion 100 has a plurality of upward extending tabs 104 that extend from a top surface 102 of the flange portion 100. The tabs 104 are generally cuboid in shape and are spaced circumferentially equidistant about the trunk centerline. However, it is contemplated that the tabs 104 can have any size and shape that enables the support trunk 40 to functions as described herein. In the exemplary embodiment, the support trunk 40 includes four (4) tabs, although fewer or more tabs are contemplated in other embodiments. The tabs 104 are configured to facilitate threading/unthreading the support trunk 40 into the container body 12.

FIG. 16 is a top perspective view of the funnel support/wiper component 38, in accordance with one aspect of the present invention. FIG. 17 is a bottom perspective view of the funnel support/wiper component 38. FIG. 18 is a side section view of the funnel support/wiper component 38, taken about line 18-18 shown in FIG. 16. In the example embodiment, the funnel support/wiper component 38 includes a hollow body 110 having a stepped bore 112 extending axially therethrough. The stepped bore 112 includes a counterbore portion 114 at a first end 116 of the body 110. The stepped bore 112 also includes a threaded bore 118 that extends from the counterbore portion 114 to a second end 120 of the body 110. The counterbore portion 114 is configured to receive a wiper ring 122 therein and the threaded bore 118 is configured to receive and threadably engage an extension tube 34.

In the exemplary embodiment, a side wall 126, defining the counterbore portion 114, includes a plurality of openings 124 therethrough. Each opening 124 is generally rectangular in shape and extends through the entirety of the side wall 126. It is contemplated, however, that in other embodiment of the present invention, the openings 124 can have any shape that enables the funnel support/wiper component 38 to function as described herein.

As described above, the counterbore portion 114 receives the wiper ring 122 therein. The openings facilitate holding the wiper ring 122 in place. For example, as depicted in FIGS. 16-18, the wiper ring 122 includes a plurality of tabs 128, each of which extends into and engages a respective one of the openings 124. Accordingly, the tabs 128 cooperate with the openings 124 to secure the wiper ring 122 within the counterbore portion 114 of the funnel support/wiper component 38. The wiper ring 122 includes an inwardly projecting seal portion 130 configured to engage a side wall of an extension tube 34 to facilitate wiping or cleaning a fluid off of the extension tube 34 as the extension tube 34 moves relative to the funnel support/wiper component 38.

The threaded bore 118 includes an internal thread 132 configured to engage a cooperative thread of an extension tube 34, for example, to facilitate adjusting a position of the extension tube 34 relative to the funnel support/wiper component 38. In the example embodiment, the internal thread 132 has a semicircular cross-section, although other thread shapes are contemplated within the ambit of the present disclosure. In the exemplary embodiment, the internal thread 132 has a pitch in the range between and including about one-half inch (0.5 in.) and about two inches (2.0 in.). More preferably, the pitch of the internal thread 132 is in the range between and including about three-quarters inch (0.75 in.) and about one and one-quarter inch (1.25 in.). Most preferably, the pitch is about one inch (1.0 in.).

In the exemplary embodiment, the body 110 includes an outwardly extending flange portion 136 projecting radially outward from the side wall 138 defining the threaded bore 118. The flange portion 136 has a thickness substantially similar to a wall thickness of the sidewalls 126 and 138 to facilitate a molding process for fabricating the funnel support/wiper component 38. The flange portion 136 is located a predefined distance from the second end 120 of the body 110 that facilitates locating the second end 120 proximate the step of the first cylindrical core 86 of the support trunk 40 (see FIG. 8). As such, the funnel support/wiper component 38 nests with the stepped bore 46 of the trunk 40. Further, the side wall 138 includes a plurality of external threads 134 extending downward from the flange portion 136 a predefined distance predetermined distance "$H_{T2}$." The distance "$H_{T2}$" is substantially similar to the predetermined distance "$H_T$" of the threaded portion 84 of the trunk 40, as shown in FIG. 8.

With reference back to FIGS. 16-18, the funnel support/wiper component 38 includes a plurality of vertically extending support ribs 140 that extend between the flange portion 136 and the side wall 126 defining the counterbore portion 114. Each of the support ribs 140 is located generally between adjacent openings 124. Further, to facilitate the molding process, each support rib 140 has a thickness substantially similar to the wall thickness of the sidewalls 126 and 138. The support ribs 140 provide lateral support to the first end 116 of the funnel support/wiper component 38, for example, during use the container assembly 10, as described further herein.

Figure 19:
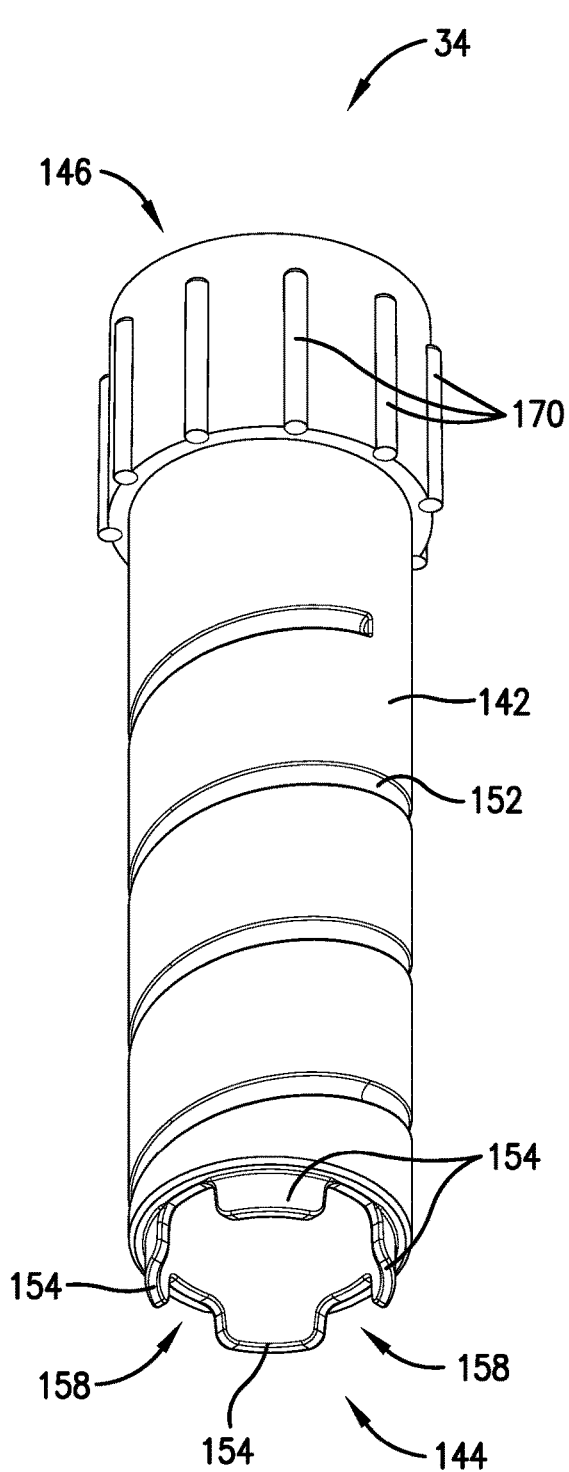
FIG. 19 is a perspective view of an extension tube of the container assembly, according to one aspect of the present invention.
Figure 20:
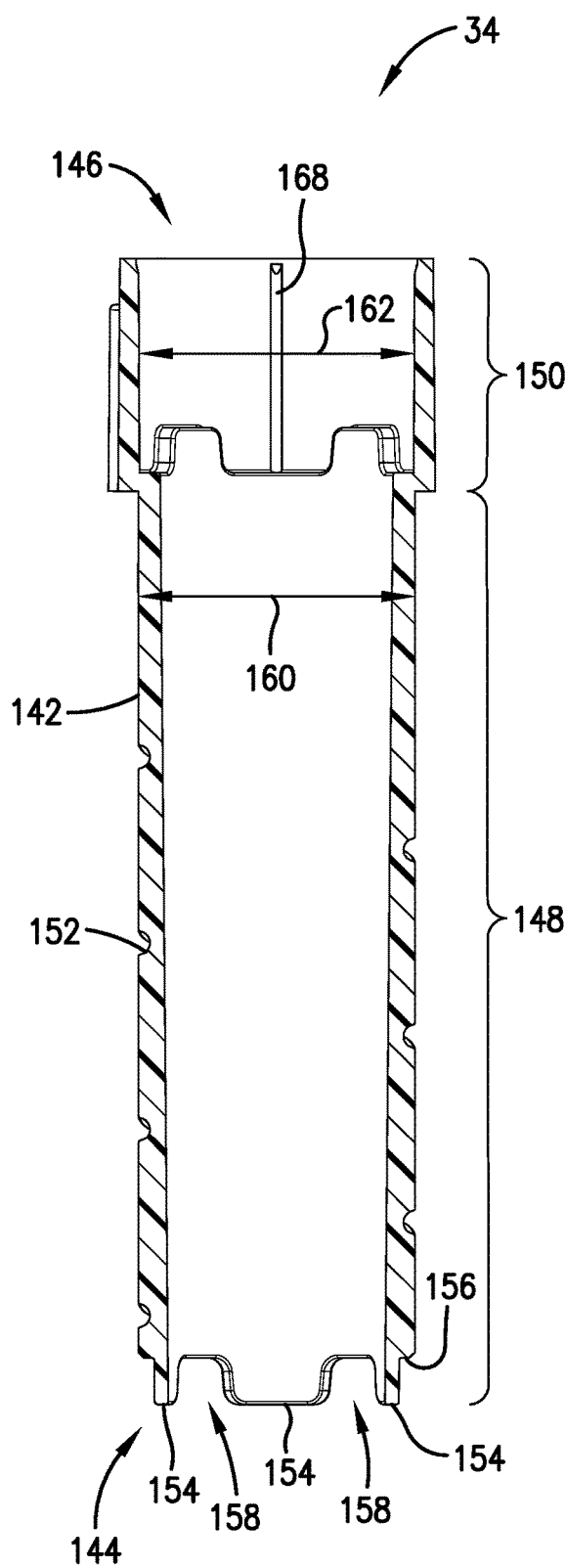
FIG. 20 is a section view of the extension tube.

FIG. 19 is a perspective view of the extension tube 34, according to one aspect of the present invention. FIG. 20 is a section view of the extension tube 34 taken about line 20-20. In the exemplary embodiment, the extension tube 34 is generally an elongated circular shaped tube defining a centerline or central axis. The extension tube 34 is fabricated with a generally constant wall thickness of its side wall 142 and is therefore hollow, defining a fluid chamber therein. That is, the wall thickness is substantially the same at any portion of the extension tube 34, except as may be noted herein. It is noted that the wall thickness may be any measure that enables the extension tube 34 to function as described herein.

The extension tube 34 presents a bottom tube end 144 and a top tube end 146. In the exemplary embodiment, the extension tube 34 has a substantially circular cross section along its length in a plane that is substantially perpendicular to the centerline. However, in other aspects of the present invention, the extension tube 34 may have any cross-sectional shape that enables the extension tube 34 to function as described herein, including, for example, rectangular, oval, polygonal, and the like.

In accordance with the present embodiment, the extension tube 34 has a lower adjustable extension portion 148 and an upper collar portion 150. In the exemplary embodiment, the extension tube 34 is fabricated as a unitary component. However, in other aspects of the present invention, the extension tube 34 may be fabricated as two or more connected components.

In the exemplary embodiment, the lower adjustable extension portion 148 has a generally constant outer diameter 160 along its length, which extends from the bottom of the extension tube 34 upward to the collar portion 150. At the bottom tube end 144, the extension tube 34 includes a plurality of axially extending fingers 154. The fingers 154 are formed coincident with the inner surface of the side wall 142 and are about one-half (½) of the wall thickness of the side wall 142. A lip 156 is defined at the intersection of the fingers 154 and the end of the side wall 142.

In the exemplary embodiment, the extension tube 34 includes four (4) fingers 154, although in other aspects of the disclosure, fewer or more fingers are contemplated. The fingers 154 are preferably spaced equidistant about the perimeter of the extension tube 34, being arranged at ninety degree (90°) points around the extension tube 34 with respect to the centerline. The fingers 154 extend generally parallel to the centerline. A plurality of notches 158 are defined between the fingers 154, and more particularly, a respective notch 158 is defined between adjacent pairs of fingers 154.

The lower adjustable extension portion 148 includes an external thread 152 defined in the side wall 142 between the bottom tube end 144 and the collar portion 150. As described herein, the external thread 152 is configured to engage the threaded bore 118 of the funnel support/wiper component 38, and as such, has a semicircular cross-section. It is contemplated, however, that other thread shapes are within the ambit of the present disclosure. In the exemplary embodiment, the external thread 152 has a pitch in the range between and including about one-half inch (0.5 in.) and about two inches (2.0 in.). More preferably, the pitch of the external thread 152 is in the range between and including about three-quarters inch (0.75 in.) and about one and one-quarter inch (1.25 in.). Most preferably, the pitch is about one inch (1.0 in.).

In the exemplary embodiment, the collar portion 150 extends from the lower adjustable extension portion 148 and has an inner diameter 162 that is larger than the outer diameter 160, therefore defining one inner lip 164 (shown in FIG. 20) or step cooperatively defined by the tube portions 148 and 150. The inner lip 164 is generally defined in a plane that is perpendicular to the centerline. In a preferred embodiment, the inner diameter 162 is larger than the outer diameter 160 by an amount in a range between and including about fifteen thousandths of an inch (0.015 in.) and about thirty-five thousandths of an inch six and forty hundredths of an inch (0.035 in.). However, in other aspects of the present invention, the difference may be any alternative measurement that enables the extension tube 34 to function as described herein.

The inner lip 164 includes a plurality of axially extending notches 166 defined therein. The notches 166 and sized and shaped to receive the fingers 154 of another respective extension tube 34. As such, respective extension tubes 34 may be stacked and nested together along their centerlines, where the fingers 154 and notches 166 interengage to prevent relative rotation between the extension tubes 34.

The inner surface of the side wall 142 of the collar portion 150 includes one or more axially extending inner ribs 168, which project inward relative to the centerline. The ribs 168 are size to facilitate causing a light interference fit with the side wall 142 of a mating extension tube 34 and/or the funnel 36. While depicted as extending axially along the collar portion 150, it is contemplated that the ribs 168 can extend other than axially in certain embodiments of the present invention. As used herein, the phrase "interference fit" means an amount of clearance between two (2) components. A negative amount of clearance is commonly referred to as an interference fit or press fit, where the magnitude of interference determines whether the fit is a light interference fit or interference fit. A small amount of positive clearance is referred to as a loose, slip, or sliding fit.

With reference to FIG. 19, the outer surface of the side wall 142 of the collar portion 150 includes one or more axially extending outer ribs 170, which project outward relative to the centerline. While depicted as extending axially along the collar portion 150, it is contemplated that the ribs 170 may extend other than axially in certain embodiments of the present invention. The ribs 170 facilitate providing a user with increased grip of the extension tube 34 during use, for example, when a fluid, such as waster oil, may reduce grip force.

Figure 21:
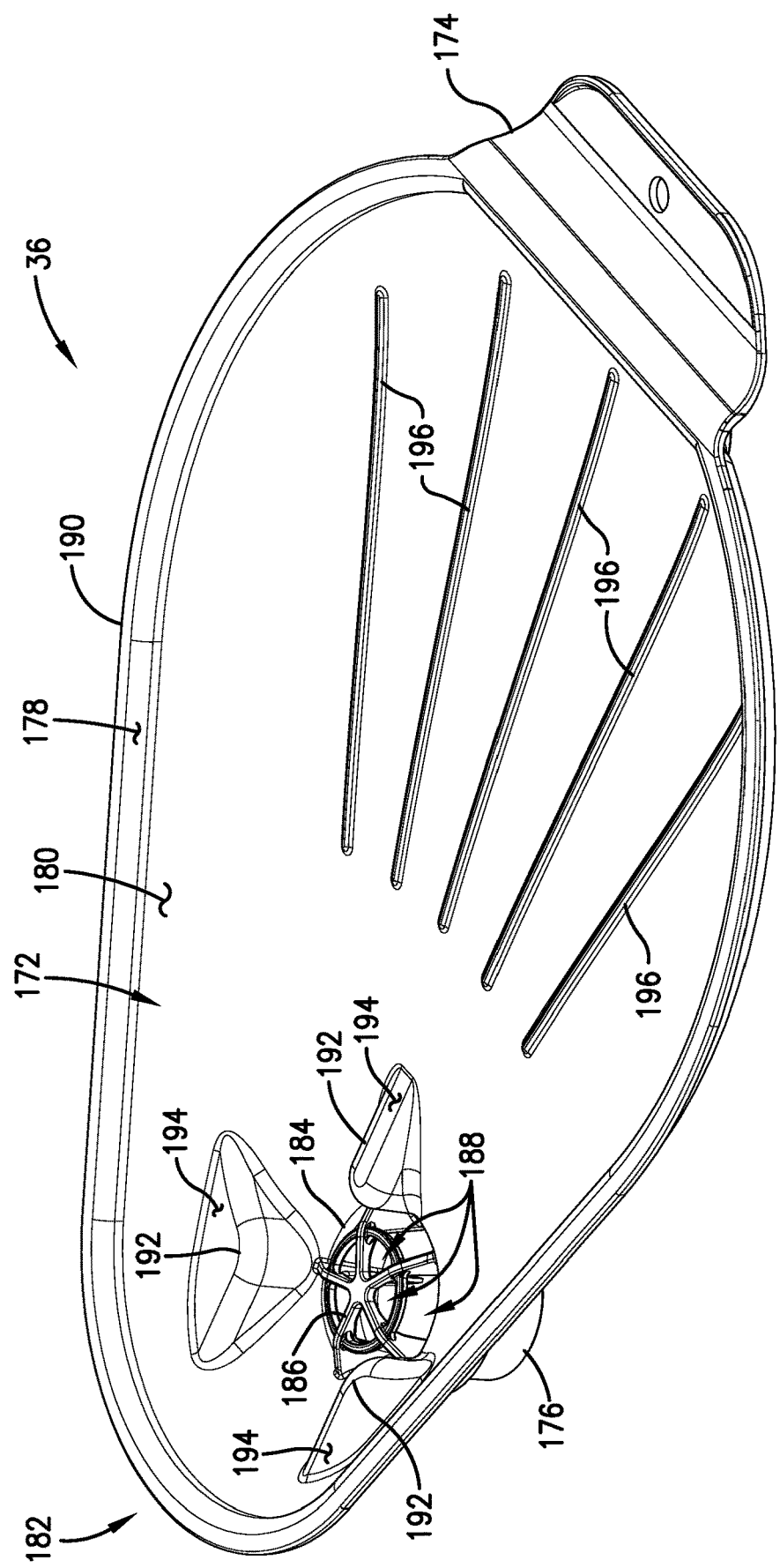
FIG. 21 is a top perspective view of the funnel of the container assembly, in accordance with one aspect of the present invention.
Figure 22:
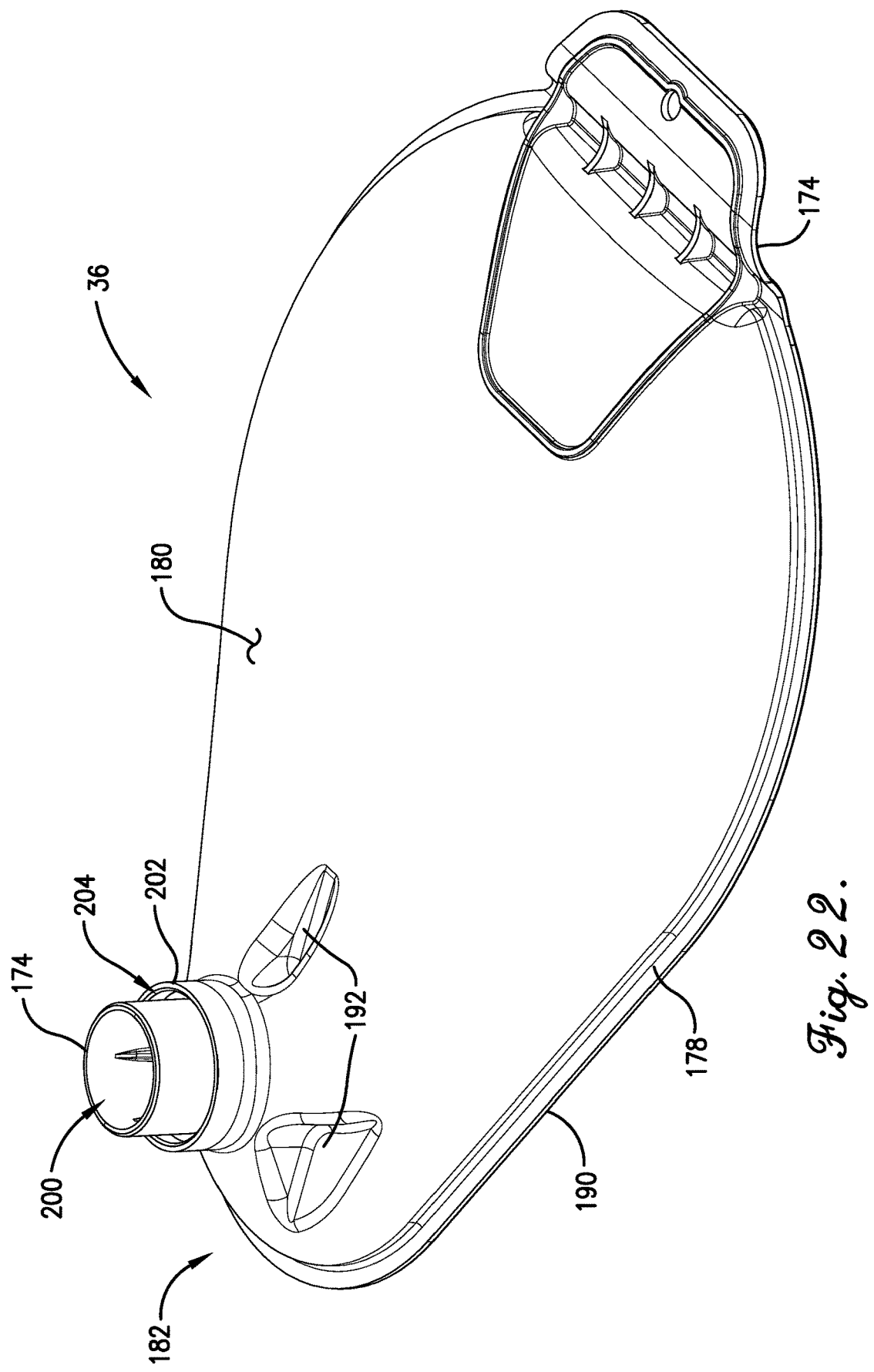
FIG. 22 is a bottom perspective of the funnel.
Figure 23:
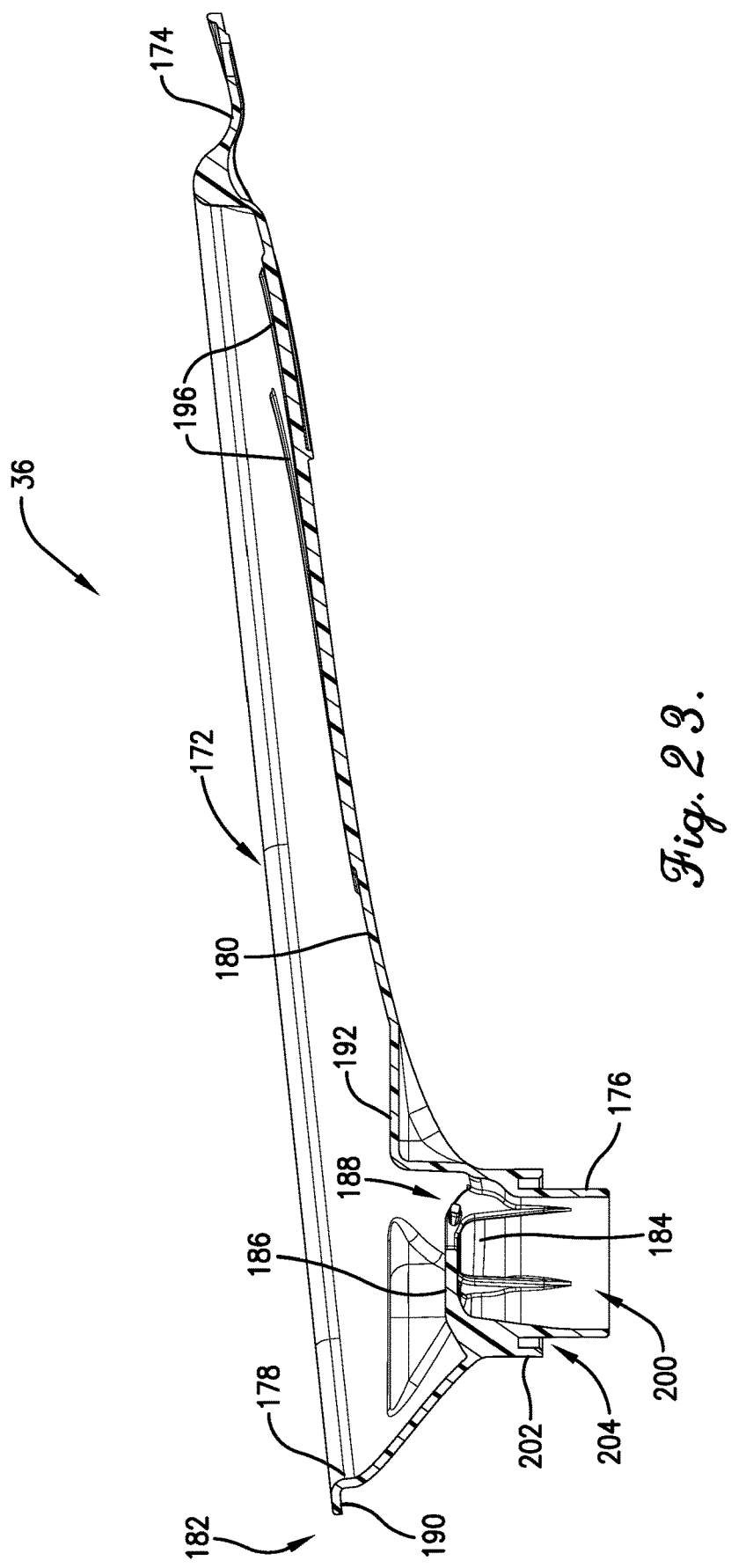
FIG. 23 is a side section view of the funnel.

FIG. 21 is a top perspective view of the funnel 36, in accordance with one aspect of the present invention. FIG. 22 is a bottom perspective of the funnel 36. FIG. 23 is a side section view of the funnel 36 taken about line 23-23 shown in FIG. 21. In the exemplary embodiment, the funnel 36 broadly includes a fluid receiving chamber 172, a spout 174, and a handle portion 176.

In the exemplary embodiment, the receiving chamber 172 receives fluid, such as waster oil, to be passed through the funnel 36 to the container body 12. The receiving chamber 172 has a generally upright side wall 178 defining a periphery of the receiving chamber 172, an open top, and a generally bowl shaped, sloping surface 180 to receive a volume of fluid therein. The upright side wall 178 has a generally outward extending flange 190, which forms at least a portion of the handle portion 176. The flange 190 provides structural support to the side wall 178 and, as described herein, engages the by a plurality of flexible fingers 58 of the container body 12 to facilitate securing the funnel to the contain body when not in use.

In the exemplary embodiment, the funnel 36 may be fabricated from a thermoplastic synthetic resin suitable for use with a hazardous fluid, such as waste oil. The funnel 36 is fabricated with a generally constant wall thickness to facilitate a molding process. That is, the wall thickness is substantially the same at any portion of the funnel 36, except as may be noted herein. It is noted that the wall thickness may be any measure that enables the funnel 36 to function as described herein. The wall thickness may be selected, for example, based on material, the size of the funnel 36, the weight of the fluid to be transferred, and/or the durability desired.

In the exemplary embodiment, the periphery of the funnel 36 is generally pear shaped, with the spout 174 located proximate the small end 182 of the funnel 36, opposite the handle portion 176. This enables the funnel to be positioned in various positions (e.g., via rotation relative to an extension tub 34, as described herein) to facilitate capturing fluid that may be drained from different locations of a reservoir, such as an engine crankcase.

In the exemplary embodiment, the sloping surface 180 extends from the side wall 178 and is defined by a varying slope, compound curve having at its low point a fill opening 184 that is coincident with and in fluid communication with the spout 174. The sloping surface 180 is configured to collect virtually all fluid (e.g., waste oil) striking the sloping surface 180 and minimize splashing of the fluid from the sloping surface 180, channeling the fluid to the fill opening 184.

In the exemplary embodiment, the fill opening 184 is preferably partially closed or blocked by a lattice structure 186 defining a plurality of openings 188. The plurality of openings 188 allow fluid, such as waste oil, collected on the sloping surface 180 to flow into the spout 174, while preventing larger elements (e.g., oil drain plugs, filters, etc.) from falling into or blocking the fill opening 184.

The sloping surface 180 preferably includes one or more upwardly projecting bosses 192 arranged around the fill opening 184. Each boss defines a planar surface 194 that is sized to receive an end of a cylindrical oil filter cartridge that has been removed for draining. The bosses 192 hold the oil filter cartridge above the fill opening 184 to allow oil to drain from the oil filter cartridge to the fill opening 184 and into the internal chamber 28 of the container body 12. In addition to supporting a cylindrical oil filter cartridge, the bosses 192 are sized and shaped to provide structural support to region of the funnel 36 where the spout 174 communicates with the sloped surface 180.

Further, the sloping surface 180 includes one or more upwardly projecting ribs 196 positioned at the large end 198 of the funnel 36, proximate the handle portion 176. The ribs 196 are generally linear and are directed generally toward the fill opening 184. The ribs facilitate providing structural support to the sloping surface 180, reducing flexing or bending of the surface from a weight of the fluid collecting thereon during use. In addition, the ribs facilitate reducing splashing the fluid as it falls onto the sloping surface 180.

In the exemplary embodiment, the handle portion 176 extends away from the sloping surface 180 proximate the large end 198. As depicted in FIG. 23, the handle portion extends generally in a direction aligned with the sectioned portion of the sloping surface 180, and thus, at an angle relative to the flange 190. This facilitates keeping the handle portion against the front wall 16 of the container body 12, as shown in FIG. 4.

The spout 174 extends from the fill opening 184 of the sloping surface 180, opposite the open top. The spout 174 is configured to channel the fluid from the receiving chamber 172 into the container body 12, for example, via an extension tube 34. The spout 174 is sized to fit within the collar portion 150 of the extension tube 34, as shown in FIG. 6. More particularly, the spout 174 is hollow, having a generally cylindrical shape opened at each end. One opening is aligned with the fill opening 184 of the sloping surface 180 and the second opening 200 is located at the distal end of the spout 174.

The funnel 36 also includes a support ring 202 depending from the sloping surface 180 and which is concentric with the spout 174. The support ring 202 is sized to define a receiving channel 204 between the spout 174 and the support ring 202. The receiving channel is configured to receive a portion of the side wall 142 of the extension tube 34 therein to provide support to the funnel 36 when in use. In particular, the channel 204 provides a positive engagement element that facilitates reducing an amount of side load on the spout 174 when a fluid is being received by the sloping surface 180.

In operation, with reference to FIG. 5, the container body 12 is placed on its back wall 18. The funnel 36 is removed from the fluid channeling portion 50, for example, by pulling the funnel flange 190 away from the flexible fingers 58, thereby unsnapping the funnel 36 from the body 12. In addition, one or more of the extension tubes 34 are removed from the extension tube pocket 60, unsnapping the tube(s) 34 from the flexible fingers 62. The funnel support/wiper component 38 is threaded into the support trunk 40 and an extension tube 34 is then threaded into the funnel support/wiper component 38. If a second extension tube 34 is being used, it is placed into the collar portion 150 of the extension tube 34 coupled to the funnel support/wiper component 38. The funnel 36 is then placed onto the collar portion 150 of the uppermost extension tube 34. The funnel 36 is rotatable relative to the extension tube 34 by any desirable amount. That is, the funnel 36 can be rotated about the extension tube 34 more than three hundred and sixty degrees (360°) in either direction. As such, the container body 12 may be placed in one spot under, for example, an engine crankcase and the funnel 36 can be rotated into various positioned to capture draining oil. For example, the funnel may be rotated into a first position to capture oil draining from an oil pan drain, and then may be rotated into a second position to capture oil draining from an oil filter location.

Along with rotation of the funnel 36 relative to the container body 12, a height of the funnel 36 relative to the container body 12 may be adjusted. For example, and without limitation, the extension tube 34 threaded into the funnel support/wiper component 38 may be rotated, thereby adjusting the vertical position of the extension tube 34 via the threaded engagement. As described herein, in a preferred embodiment, one (1) rotation of the extension tube 34 may adjust a height of the funnel 36 by one inch (1 in.). By positioning the funnel 36 close to the oil drain location, for example of the engine, splashing of the waste oil may be reduced.

As described herein, after a user completes the process of draining a fluid into the container body 12, the funnel 36, the funnel support/wiper component 38, and any extension tubes 34 are removed or detached from the container body 12. The drain cap 48 is coupled to the support trunk 40 to seal the fluid in the container body 12. The fluid collection system 14 (i.e., the extension tube(s) 34, the funnel 36, and the funnel support/wiper component 38) may be cleaned and attached to the container body 12, for example, for storage. In particular, the funnel 36 may be pressed into place on the front wall 16 of the container body 12 and held in place by the flexible fingers 58. In addition, each of the extension tubes 34 may be pressed into place on the front wall 16 of the container body 12 and held in place by the flexible fingers 62. Moreover, the funnel support/wiper component 38 may be coupled to the spout 174 of the funnel 36.

Advantageously, embodiments of the present invention provide for a fluid container assembly for capturing and storing a hazardous fluid, such as waster oil. In particular, the present inventions provides a stable, adjustable fluid collection system that enables a user to position a fluid receiving funnel in various locations to capture a draining fluid, without the need to reposition the container. For example, a pear-shaped funnel can be rotated 360° to cover a broad area under a crankcase and a height of the funnel may be adjusted to reduce the distance the draining oil must fall. Although widely applicable, the present invention is particularly useful for draining oil from large vehicles, such as trucks, where an engine crankcase may be expansive and/or positioned an increased distance from a ground surface.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

What is claimed is:

1. A container assembly for receiving and storing a fluid, the container assembly comprising:
   a hollow container body having an internal chamber for receiving and storing the fluid, the container body comprising a front wall and an opposing back wall at least partially defining the internal chamber, the front wall comprising an opening therethrough to allow the fluid to be received in the internal chamber;
   a hollow support trunk coupled to the opening in the front wall, the support trunk extending through the internal chamber and comprising a distal end engaging the back wall, the support trunk providing support to the front wall and channeling the fluid from the opening to the internal chamber,
   the support trunk comprising a lattice structure partially closing the distal end, the lattice structure defining a plurality of openings to permit the fluid to flow into the internal chamber while the lattice structure is in contact with the back wall.

2. The container assembly in accordance with claim 1 further comprising a fluid collection system releasably coupled to the front wall of the container body,
   at least a portion of the fluid collection system extending outward beyond the front wall,
   the back wall comprising a plurality of pockets defined therein,
   the plurality of pockets being sized and shaped to receive the at least a portion of the fluid collection system whereby two or more of the container assembly may be stacked together with the at least a portion of the fluid collection system of one container assembly being nested within the plurality of pockets of another container assembly.

3. The container assembly in accordance with claim 2, the fluid collection system comprising:
   a funnel;
   one or more extension tubes; and
   a funnel support/wiper component.

4. The container assembly in accordance with claim 3,
   the front wall comprising an inwardly extending fluid channeling portion configured to channel the fluid to the opening, the opening being defined in the fluid channeling portion.

5. The container assembly in accordance with claim 4,
   the opening comprising a threaded bore,
   the support trunk comprising a threaded portion that include threads configured to threadably engage the threaded bore.

6. The container assembly in accordance with claim 4,
   the fluid channeling portion comprising an inwardly sloping surface and a surrounding side wall, the opening located at a lowermost portion of the sloping surface.

7. The container assembly in accordance with claim 6,
   the side wall comprising a plurality of inwardly projecting flexible fingers configured to engage the funnel to secure the funnel to the front wall.

8. The container assembly in accordance with claim 3, wherein
   the funnel support/wiper component is releasably coupled to the support trunk;
   a first one of the extension tubes is releasably coupled to the funnel support/wiper component; and
   the funnel is releasably coupled to the first one of the extension tubes, the funnel being rotatable relative to the first one of the extension tubes at least 360°.

9. The container assembly in accordance with claim 8,
   the funnel support/wiper component comprising a threaded bore for receiving the first one of the extension tubes therethrough, the threaded bore comprising an internal thread;
   the first one of the extension tubes comprising a lower adjustable extension portion having an external thread formed thereon, the external thread configured to engage the internal thread of the funnel support/wiper component,
   wherein rotation of the first one of the extension tubes adjusts the first one of the extension tubes relative to the funnel support/wiper component to raise or lower the funnel relative to the container body.

10. The container assembly in accordance with claim 9,
    the external and internal thread having a pitch in a range between and including about one-half inch (0.5 in.) and about two inches (2.0 in.).

11. The container assembly in accordance with claim 8,
    the funnel support/wiper component comprising a wiper ring,
    the wiper ring comprising a seal portion configured to engage the first one of the extension tubes to wipe the fluid therefrom.

12. The container assembly in accordance with claim 8,
    the first one of the extension tubes comprising a collar portion;
    the funnel comprising a spout configured to channel the fluid into the container body and a support ring extending about the spout,
    the support ring and the spout cooperatively defining a receiving channel for receiving a portion of the collar portion of the first one of the extension tubes, the receiving channel configured to provide support to the funnel.

13. The container assembly in accordance with claim 3,
the funnel comprising a fluid receiving chamber, a spout, a handle portion,
the fluid receiving chamber comprising a fill opening in fluid communication with the spout,
the funnel further comprising a plurality of upwardly projecting bosses arranged around the fill opening, the bosses configured to support an end of a cylindrical oil filter cartridge above the fill opening.

14. The container assembly in accordance with claim 1,
the container body further comprising a bottom wall, a top wall, a first side wall, and a second side wall extending between and joining the front wall to the back wall to define the internal chamber.

15. The container assembly in accordance with claim 14,
the container body comprising a spout extending from the top wall, the spout in fluid communication with the internal chamber,
the container body further comprising a handle formed on one of the first side wall and the second side wall opposite the spout.

16. A container assembly for receiving and storing a fluid, the container assembly comprising:
a hollow container body having an internal chamber for receiving and storing the fluid, the container body comprising a front wall and an opposing back wall at least partially defining the internal chamber, the front wall comprising an opening therethrough to allow the fluid to be received in the internal chamber;
a hollow support trunk coupled to the opening in the front wall, the support trunk extending through the internal chamber and comprising a distal end engaging the back wall, the support trunk providing support to the front wall and channeling the fluid from the opening to the internal chamber,
the back wall comprising a plurality of inward projecting bosses,
the bosses positioned in surrounding relationship relative to the distal end of the support trunk to provide lateral support to the distal end of the support trunk.

17. The container assembly in accordance with claim 16 further comprising a fluid collection system releasably coupled to the front wall of the container body,
at least a portion of the fluid collection system extending outward beyond the front wall,
the back wall comprising a plurality of pockets defined therein,
the plurality of pockets being sized and shaped to receive the at least a portion of the fluid collection system whereby two or more of the container assembly may be stacked together with the at least a portion of the fluid collection system of one container assembly being nested within the plurality of pockets of another container assembly.

18. The container assembly in accordance with claim 16,
the container body further comprising a spout in fluid communication with the internal chamber, and a handle opposite the spout.

19. A container assembly for receiving and storing a fluid, the container assembly comprising:
a hollow container body having an internal chamber for receiving and storing the fluid, the container body comprising a front wall and an opposing back wall at least partially defining the internal chamber, the front wall comprising an opening therethrough to allow the fluid to be received in the internal chamber;
a hollow support trunk coupled to the opening in the front wall, the support trunk extending through the internal chamber and comprising a distal end engaging the back wall, the support trunk providing support to the front wall and channeling the fluid from the opening to the internal chamber;
a fluid collection system releasably coupled to the front wall of the container body,
at least a portion of the fluid collection system extending outward beyond the front wall,
the back wall comprising a plurality of pockets defined therein,
the plurality of pockets being sized and shaped to receive the at least a portion of the fluid collection system whereby two or more of the container assembly may be stacked together with the at least a portion of the fluid collection system of one container assembly being nested within the plurality of pockets of another container assembly,
the fluid collection system comprising:
a funnel;
one or more extension tubes; and
a funnel support/wiper component,
the front wall comprising an inwardly extending extension tube pocket configured to secure the one or more extension tubes to the front wall.

20. The container assembly in accordance with claim 19,
the inwardly extending extension tube pocket comprising a plurality of inwardly projecting flexible fingers configured to engage one of the extension tubes to secure the extension tube to the front wall.

* * * * *